(12) United States Patent
Özer et al.

(10) Patent No.: US 7,937,535 B2
(45) Date of Patent: May 3, 2011

(54) MANAGING CACHE COHERENCY IN A DATA PROCESSING APPARATUS

(75) Inventors: Emre Özer, Cambridge (GB); Stuart David Biles, Little Thurlow (GB); Simon Andrew Ford, Cambridge (GB)

(73) Assignee: ARM Limited, Cambridge (GB)

( * ) Notice: Subject to any disclaimer, the term of this patent is extended or adjusted under 35 U.S.C. 154(b) by 1106 days.

(21) Appl. No.: 11/709,279

(22) Filed: Feb. 22, 2007

(65) Prior Publication Data

US 2008/0209133 A1   Aug. 28, 2008

(51) Int. Cl.
G06F 12/00 (2006.01)
G06F 13/00 (2006.01)
G06F 13/28 (2006.01)

(52) U.S. Cl. ........ 711/146; 711/141; 711/142; 711/143; 711/144; 711/145

(58) Field of Classification Search ........... 711/141–146
See application file for complete search history.

(56) References Cited

U.S. PATENT DOCUMENTS

| | | | |
|---|---|---|---|
| 6,272,520 B1 | 8/2001 | Sharangpani et al. | |
| 6,338,123 B2 * | 1/2002 | Joseph et al. | 711/144 |
| 6,704,845 B2 * | 3/2004 | Anderson et al. | 711/146 |
| 6,721,848 B2 * | 4/2004 | Gaither | 711/122 |
| 6,810,467 B1 * | 10/2004 | Khare et al. | 711/146 |
| 6,874,062 B1 * | 3/2005 | Goldberg | 711/117 |
| 6,907,520 B2 | 6/2005 | Parady | |
| 7,093,079 B2 * | 8/2006 | Quach et al. | 711/141 |
| 7,213,106 B1 * | 5/2007 | Koster et al. | 711/119 |
| 7,325,102 B1 * | 1/2008 | Cypher | 711/146 |
| 7,392,351 B2 * | 6/2008 | Blumrich et al. | 711/146 |
| 2002/0087765 A1 * | 7/2002 | Kumar et al. | 710/107 |
| 2005/0060457 A1 | 3/2005 | Olukotun | |
| 2007/0186054 A1 * | 8/2007 | Kruckemyer et al. | 711/144 |

FOREIGN PATENT DOCUMENTS

| | | |
|---|---|---|
| EP | 0 992 912 | 4/2000 |
| JP | 1-201740 | 8/1989 |
| WO | WO 2005/017708 | 2/2005 |

OTHER PUBLICATIONS

A. Moshovos et al, "JETTY: Filtering Snoops for Reduced Energy Consumpation in SMP Servers" Proceedings of the 7th International Symposium on High-Performance Computer Architecture, (HPCA-7), Jan. 2001.

(Continued)

Primary Examiner — Yaima Campos
(74) Attorney, Agent, or Firm — Nixon & Vanderhye P.C.

(57) ABSTRACT

Each of plural processing units has a cache, and each cache has indication circuitry containing segment filtering data. The indication circuitry responds to an address specified by an access request from an associated processing unit to reference the segment filtering data to indicate whether the data is either definitely not stored or is potentially stored in that segment. Cache coherency circuitry ensures that data accessed by each processing unit is up-to-date and has snoop indication circuitry whose content is derived from the already-provided segment filtering data. For certain access requests, the cache coherency circuitry initiates a coherency operation during which the snoop indication circuitry determines whether any of the caches requires a snoop operation. For each cache that does, the cache coherency circuitry issues a notification to that cache identifying the snoop operation to be performed.

19 Claims, 24 Drawing Sheets

OTHER PUBLICATIONS

C. Saldanha et al, "Power Efficient Cache Coherence" Workshop on Memory Performance Issues in Conjunction with ISCA, Jun. 2001.
M. Ekman et al, "Evaluation of Snoop-Energy Reduction Techniques for Chip-Multiprocessors" Workshop on Duplicating, Deconstructing and Debunking, in Conjunction with ISCA, May 2002.
M. Ekman et al, "TLB and Snoop Energy-Reduction using Virtual Caches in Low-Power Chip-Multiprocessors" ISLPED '02, Aug. 2002.
A. Moshovos, "RegionScout: Exploiting Coarse Grain Sharing in Snoop-Based Coherence" Proceedings of the $32^{nd}$ Annual International Symposium on Computer Architecture, 2005.
G. Memik et al, "Just Say No: Benefits of Early Cache Miss Determination" Proceedings of the Ninth International Symposium on High-Performance Computer Architecture (HPCA-9'03), 2003.
J. Peir et al, "Bloom Filtering Cache Misses for Accurate Data Speculation and Prefetching" Proceedings of the Sixteenth International Conference of Supercomputing, 2002, pp. 189-198.
N. Mehta et al, "Fetch Halting on Critical Load Misses" Proceedings of the $22^{nd}$ International Conference on Computer Design, 2004.
A. Hasegawa et al, "SH3: High Code Density, Low Power" IEEE Micro, 1995, pp. 11-19.
R.E. Kessler et al, "The Alpha 21264 Microprocessor Architecture" IEEE Micro, 19(2):24-36, Apr. 1999.
G. Reinman et al, "Using a Serial Cache for Energy Efficient Instruction Fetching" Journal of Systems Architecture, 2004, pp. 1-21.
B. Calder et al, "Predictive Sequential Associative Cache" $2^{nd}$ International Symposium on High Performance Computer Architecture, HPCA'96, Feb. 1996.
K. Inoue, et al, "Way-Predicting Set-Associative Cache for High Performance and Low Energy Consumption" ISLPED, 1999.
M. Powell et al, "Reducing Set-Associative Cache Energy via Way-Prediction and Selective Direct-Mapping" Proceedings of the $34^{th}$ International Symposium in Microarchitecture (MICRO), 2001.
B. Batson et al, "Reactive-Associative Caches" Conference on Parallel Architectures and Compilation, PACT'01, 2001.
A. Ma et al, "Way Memoization to Reduce Fetch Energy in Instruction Caches" Workshop on Complexity Effective Design, Jul. 2001, pp. 1-8.
T. Ishihara et al, "A Way Memoization Technique for Reducing Power Consumption of Caches in Application Specific Integrated Processors" Proceedings of the Design, Automation and Test in Europe Conference and Exhibition (Date'05), 2005.
R. Min et al, "Location Cache: A Low-Power L2 Cache System" ISLPED'04, Aug. 2004.
D. Nicolaescu et al, "Reducing Power Consumption for High-Associativity Data Caches in Embedded Processors" Date'03, 2003.
Y. Chang et al, "Sentry Tag: An Efficient Filter Scheme for Low Power Cache" Australian Computer Science Communications, 2002, pp. 135-140.
C. Zhang et al, "A Way-Halting Cache for Low-Energy High-Performance Systems" ISLPED'04, Aug. 2004, pp. 1-6.
Y. Chang et al, "Design and Analysis of Low-Power Cache Using Two-Level Filter Scheme IEEE Transactions on Very Large Scale Integration (VLSI) Systems" vol. 11, No. 4, Aug. 2003, pp. 568-580.
J. Park et al, "Power-Aware Deterministic Block Allocation for Low-Power Way-Selective Cache Structure" IEEE International Conference on Computer Design (ICCD'04), 2004.
D. Albonesi, "Selective Cache Ways: On-Demand Cache Resource Allocation" Journal of Instruction-Level Parallelism 2, May 2000, pp. 1-22.
B. Bloom, "Space/Time Trade-offs in Hash Coding With Allowable Errors" Communications of the ACM, vol. 13, No. 7, Jul. 1970, pp. 422-426.
A. Broder et al, "Network Applications of Bloom Filters: a Survey" $40^{th}$ Annual Allerton Conference on Communication, Control, and Computing, 2002, Internet Mathematics vol. 1, No. 4, pp. 485-509.
S. Rhea et al, "Probabilistic Location and Routing" IEEE INFOCOM'02, Jun. 2002, pp. 1-10.
S. Dharmapurikar et al, "Deep Packet Inspection Using Parallel Bloom Filters" IEEE Hot Interconnects 12, Stanford, CA, Aug. 2003, pp. 1-8.
A. Kumar et al, "Space-Code Bloom Filter for Efficient Per-Flow Traffic Measurement" Proc. IEEE INFOCOM, 2004.
F. Chang et al, "Approximate Caches for Packet Classification" IEEE INFOCOM'04, Mar. 2004.
S. Cohen et al, "Spectral Bloom Filters" Proceedings of the 2003 ACM SIGMOD International Conference on Management of Data, 2003, pp. 241-252.
S. Sethumadhavan et al, "Scalable Hardware Memory Disambiguation for High ILP Processors" Proceedings of the $36^{th}$ International Symposium on Microarchitecture (MICRO-36 2003), 2003.
A. Roth, "Store Vulnerability Window (SVW): Re-Execution Filtering for Enhanced Load Optimization" Proceedings of $32^{nd}$ International Symposium on Computer Architecture (ISCA-32), Jun. 2005, pp. 1-11.
H. Akkary et al, "Checkpoint Processing and Recovery: Towards Scalable Large Instruction Window Processors" Microprocessor Research Labs, Intel Corporation.
L. Fan et al, "Summary Cache: A Scalable Wide-Area Web Cache Sharing Protocol" IEEE/ACM Transactions on Networking, vol. 8, No. 3, Jun. 2000, pp. 281-293.
M. Corliss et al, "Low-Overhead Interactive Debugging via Dynamic Instrumentation with DISE" Proceedings of the $11^{th}$ Int'l Symposium on High-Performance Computer Architecture (HPCA-11 2005).
P. Zhou et al, "AccMon: Automatically Detecting Memory-related Bugs via Program Counter-based Invariants" Proceedings of the $37^{th}$ International Symposium on Microarchitecture (MICRO-37 2004).
S. Dharmapurikar et al, "Longest Prefix Matching Using Bloom Filters" SIGCOMM'03, Aug. 2003.
U.S. Appl. No. 11/990,394, filed Feb. 13, 2008, Ghosh et al.
U.S. Appl. No. 12/224,725, filed Sep. 4, 2008, Ford et al.
U.S. Appl. No. 12/224,671, filed Sep. 3, 2008, Ford et al.
International Search Report for International Application PCT/GB2005/003531, mailed Aug. 29, 2006.
Written Opinion of the International Searching Authority for PCT/GB2005/003531, mailed Aug. 29, 2006.
International Preliminary Report on Patentability for PCT/GB2005/003531, mailed Oct. 12, 2007.
International Search Report for PCT/GB2006/000795, mailed Nov. 10, 2006.
Written Opinion of the International Searching Authority for PCT/GB2006/000795, mailed Nov. 10, 2006.
International Preliminary Report on Patentability for PCT/GB2006/000795, dated May 27, 2008.
International Search Report for PCT/GB2006/000754, mailed Nov. 7, 2006.
Written Opinion of the International Searching Authority for PCT/GB2006/000754, mailed Nov. 7, 2006.
International Preliminary Report on Patentability for PCT/GB2006/000754, dated May 16, 2008.
Office Action mailed Jan. 14, 2011 in co-pending U.S. Appl. No. 12/224,671.

* cited by examiner

MANAGING CACHE COHERENCY IN A DATA PROCESSING APPARATUS

TECHNICAL FIELD

The technical field relates to techniques for managing cache coherency in a data processing apparatus.

BACKGROUND

It is known to provide multi-processing systems in which two or more processing units, for example processor cores, share access to shared memory. Such systems are typically used to gain higher performance by arranging the different processor cores to execute respective data processing operations in parallel. Known data processing systems which provide such multi-processing capabilities include IBM370 systems and SPARC multi-processing systems. These particular multi-processing systems are high performance systems where power efficiency and power consumption is of little concern and the main objective is maximum processing speed.

To further improve speed of access to data within such a multi-processing system, it is known to provide each of the processing units with its own local cache in which to store a subset of the data held in the shared memory. Whilst this can improve speed of access to data, it complicates the issue of data coherency. In particular, it will be appreciated that if a particular processor performs a write operation with regards to a data value held in its local cache, that data value will be updated locally within the cache, but may not necessarily also be updated at the same time in the shared memory. In particular, if the data value in question relates to a write back region of memory, then the updated data value in the cache will only be stored back to the shared memory when that data value is subsequently evicted from the cache.

Since the data may be shared with other processors, it is important to ensure that those processors will access the up-to-date data when seeking to access the associated address in shared memory. To ensure that this happens, it is known to employ a cache coherency protocol within the multi-processing system to ensure that if a particular processor updates a data value held in its local cache, that up-to-date data will be made available to any other processor subsequently requesting access to that data.

In accordance with a typical cache coherency protocol, certain accesses performed by a processor will require a coherency operation to be performed. The coherency operation will cause a notification (also referred to herein as a snoop request) to be sent to the other processors identifying the type of access taking place and the address being accessed. This will cause those other processors to perform certain actions defined by the cache coherency protocol, and may also in certain instances result in certain information being fed back from one or more of those processors to the processor initiating the access requiring the coherency operation. By such a technique, the coherency of the data held in the various local caches is maintained, ensuring that each processor accesses up-to-date data. One such cache coherency protocol is the "Modified, Exclusive, Shared, Invalid" (MESI) cache coherency protocol.

If a particular piece of data can be guaranteed to be exclusively used by only one of the processors, then when that processor accesses that data, a coherency operation will not be required. However, in a typical multi-processing system, much of the data will be shared amongst the processors, either because the data is generally classed as shared data, or because the multi-processing system allows for the migration of processes between processors, or indeed for a particular process to be run in parallel on multiple processors, with the result that even data that is specific to a particular process cannot be guaranteed to be exclusively used by a particular processor.

Accordingly, it will be appreciated that coherency operations will be required to be performed frequently, and this will result in significant numbers of snoop requests being issued to the caches to cause those caches to perform a snoop operation in order to determine whether the data value the subject of a particular access request is or is not within those caches. Hence, by way of example, if a cache line in the cache associated with one of the processing units has its data content modified, and that data is shared, this will typically cause a coherency operation to be performed as a result of which snoop requests will be issued to all of the other caches associated with the other processing units to cause those caches to perform snoop operations. If the same cache line is stored within those caches, that copy of the cache line will either be invalidated or updated dependent on the coherency protocol being applied. However, if in fact a copy of that cache line does not reside in the cache, nothing further is required, but some energy is consumed as a result of performing the snoop operation within the cache due to the lookup performed with respect to the tag entries of the cache. Accordingly, it can be seen that the data processing apparatus consumes some considerable energy (also referred to as a snoop energy) in performing snoop operations in order to find out whether a copy of a cache line exists in a cache or not. Traditionally this is done for each cache associated with each processing unit, and if the snoop hit rate is very low (i.e. a large proportion of the caches subjected to the snoop operation do not locate a copy of the cache line in question), it is clear that significant snoop energy is wasted.

Whilst energy consumption in some multi-processing systems may not be a key concern, as use of multi-processing systems becomes more widespread, there are many modern day implementations (e.g. multi-core systems) where energy consumption is very important.

A number of techniques have been developed with the aim of seeking to reduce the energy consumption associated with performing such snoop operations in a data processing apparatus having multiple processing units. For example, the article entitled "JETTY: Filtering Snoops for Reduced Energy Consumption in SMP Servers" by A Moshovos et al, Proceedings of International Symposium on High Performance Computer Architecture (HPCA-7), January 2001, describes a technique for reducing the energy consumed by snoop requests in a symmetric multiprocessor (SMP) system, where a small, cache-like, structure, referred to therein as a JETTY, is introduced in between the bus and the level two cache at each SMP node. Each SMP node has local level one data and instruction caches and a level two cache. Every snoop request issued over the snoop bus to an SMP node first goes to the associated JETTY, with a lookup being performed in that JETTY to determine whether the data value in question is definitely not in the associated level two cache (and accordingly that level two cache does not need to subjected to a snoop operation), or whether there may be a copy of the data value in question in that cache (and therefore the level two cache does need to be subjected to a snoop operation). In accordance with one embodiment described, a Bloom filter mechanism is used to implement each JETTY.

Another SMP-based snoop energy reduction technique was proposed by Saldanha et al in the article "Power Efficient Cache Coherence", Workshop on Memory Performance Issues in Conjunction with ISCA, June 2001. In this article, a similar SMP structure is described to that disclosed in the earlier JETTY article, namely having four processor nodes, each having a level two cache. The approach described in the article to reduce snoop energy is to serialise the snooping process in a hierarchical way. This technique is described in the article as "Serial Snooping", which is only applied to read misses. In the event of a read miss, the neighbour node of the requesting processor is snooped to get the requested block of data. If that neighbour node does not have the requested block, the next node is snooped. This process is continued until a cache or the memory supplies the requested block. Two drawbacks of such an approach are that it can only reduce the volume of snoop operations resulting from read misses, and also it increases the latency of the load operation.

In the article "Evaluation of Snoop-Energy Reduction Techniques for Chip-Multiprocessors" by M Ekman et al, Workshop on Duplicating, Deconstructing and Debunking, in Conjunction with ISCA, May 2002, the above mentioned JETTY and serial snooping techniques are evaluated and it is concluded in that article that serial snooping does not manage to cut much energy because most of the time no caches will be able to respond, which means that all caches will be searched. With regard to the JETTY technique, it is observed that a significant portion of the snoop energy is cut but this saving is outweighed by the energy lost in implementing the JETTY mechanism.

The article "TLB and Snoop Energy-Reduction using Virtual Caches in Low-Power Chip-Multiprocessors", by M. Ekman et al, ISPLED '02, August 2002, describes a snoop filtering technique for level 1 virtual caches in a Chip-Multiprocessor (CMP) system. Each cache keeps track of memory pages rather than single cache blocks shared by other caches using a table called a page sharing table (PST). When a new page is loaded into the cache, its PST table sends the physical address of the new page to all other PSTs. These PSTs check whether they share the page and acknowledge to the initiating PST if the page is shared so that the initiating PST knows who shares this page. The main disadvantage of this technique is that when a PST entry is evicted, all cache blocks belonging to the page must be flushed from the cache. In order to avoid this, the authors introduce an additional hardware mechanism, which complicates the design of the snoop filter hardware.

The article "RegionScout: Exploiting Coarse Grain Sharing in Snoop-Based Coherence", by A Moshovos, Proceedings of the 32nd Annual International Symposium on Computer Architecture, 2005, describes another snoop filtering technique that performs filtering at a coarser granularity, i.e. memory regions rather than cache blocks. Each memory region consists of a contiguous portion of the memory. For each SMP or CMP node, two tables are provided to provide snoop filtering, namely a Not Shared Region Table (NSRT) which is a small set-associative cache that keeps a record of regions that are not shared, and a Cache Region Hash (CRH) table which is a hash table that records regions that are locally cached. The CRH is accessed by the region address and each entry contains a counter that counts the number of the matching cache blocks in the region and a present bit. In this sense, the CRH works like the earlier-mentioned Jetty scheme. When a cache sends a snoop request to other caches, the other caches first check their own CRH to check whether they have a block in this region. If none of the caches have a block in this region, then the requesting cache allocates an entry in its NSRT meaning that it has the region but it is not shared by anyone. Next time around a snoop request will not be broadcast to other caches because the local NSRT says the region is not shared. However, later on when another cache wants to share the same region, the cache that has the region has to invalidate its NSRT entry for that region, meaning that the region is now shared. The disadvantage of this scheme is that every snoop request requires performance of a lookup in the local NSRT as well as the other NSRTs. This increases energy consumption because of the NSRT tag lookups.

Accordingly, it would be desirable to provide an improved technique for reducing energy consumption when managing cache coherency in a data processing apparatus.

SUMMARY

Viewed from a first aspect, a data processing apparatus comprises a plurality of processing units for performing data processing operations requiring access to data in shared memory, each processing unit when access to data is required issuing an access request specifying an address in memory associated with that data; each processing unit having a cache associated therewith and comprising a plurality of segments for storing a subset of said data for access by that processing unit, each cache being responsive to at least a subset of the access requests issued by its associated processing unit to perform a lookup procedure; each cache having indication circuitry associated therewith containing segment filtering data, the indication circuitry being responsive to an address portion of the address to reference the segment filtering data to provide, for each of at least a subset of the segments, an indication as to whether the data is either definitely not stored in that segment or is potentially stored within that segment, the indications produced by the indication circuitry being used by the cache to affect the lookup procedure; and cache coherency circuitry employing a cache coherency protocol to ensure data accessed by each processing unit is up-to-date, the cache coherency circuitry having snoop indication circuitry associated therewith whose content is derived from the segment filtering data of each said indication circuitry, for certain access requests the cache coherency circuitry initiating a coherency operation during which the snoop indication circuitry is referenced to determine whether any of said caches require subjecting to a snoop operation, for each cache for which it is determined a snoop operation should be performed, the cache coherency circuitry being arranged to issue a notification to that cache identifying the snoop operation to be performed.

The cache coherency circuitry takes advantage of information held by indication circuitry provided for each cache associated with a processing unit of the data processing apparatus to determine which caches should be subjected to a snoop operation. In particular, the indication circuitry associated with each cache contains segment filtering data, and when an access request is issued by the associated processing unit, the segment filtering data is referenced to provide, for each of at least a subset of the segments, an indication as to whether the data that is the subject of the access request is either definitely not stored in that segment or is potentially stored within that segment. This information is used to influence the lookup procedure performed within the cache in response to the access request. The cache coherency circuitry has snoop indication circuitry associated therewith whose content is derived from the segment filtering data of each indication circuitry. For certain access requests, the cache coherency circuitry will determine that a coherency operation is needed, and when performing the coherency operation the snoop indication circuitry will be referenced to determine whether any of the caches require subjecting to a snoop operation. For any such identified caches, the cache coherency circuitry then issues a notification to that cache identifying the snoop operation to be performed.

Since the content of the snoop indication circuitry provided in association with the cache coherency circuitry is derived from the segment filtering data already provided within the indication circuitry associated with each cache, this approach involves significantly less hardware cost than the known prior art techniques. Further, since the underlying segment filtering data from which the content of the snoop indication circuitry is derived provides information about the definite absence of data or potential presence of data on a segment-by-segment basis, the notifications issued to individual caches can provide more detailed information about the snoop operation to be performed than is possible in the known prior art techniques. For example, it is possible in example embodiments for such notification to not merely identify that the cache receiving that notification should perform a snoop operation, but also identifying to the cache the particular segments within the cache to be subjected to the snoop operation. This can yield significant further energy savings when compared with techniques which would merely identify on a cache-by-cache basis whether a snoop operation should be performed within the cache.

The granularity of information provided within each notification issued to a cache that the cache coherency circuitry determines should be subjected to a snoop operation can take a variety of forms. However, in one embodiment, each said notification issued by the cache coherency circuitry identifies the segments of the cache to be subjected to the snoop operation. Accordingly, the content of the snoop indication circuitry in such embodiments maintains the segment-by-segment nature of the filtering data of each cache's associated indication circuitry so that the notifications issued by the cache coherency circuitry can identify particular segments of a cache to be subjected to the snoop operation.

The content of the snoop operation circuitry can be derived in a variety of ways. In one embodiment, the snoop indication circuitry maintains a copy of at least part of the segment filtering data of each said indication circuitry. In some embodiments, this will involve the snoop indication circuitry maintaining a copy of all of the segment filtering data maintained by each cache's associated indication circuitry. By such an approach, the cache coherency circuitry can perform per-segment cache snoop filtering with a relatively small storage space in order to achieve significant cache energy savings.

In an alternative embodiment, the snoop indication circuitry maintains summary data derived from the segment filtering data of each said indication circuitry. By such an approach, the amount of storage required by the snoop indication circuitry is reduced, since summary data is maintained rather than keeping a replica copy of the segment filtering data. Further, in accordance with such embodiments, the energy consumption of the snoop indication circuitry is reduced given the reduced size of the data referenced by the snoop indication circuitry. Nevertheless, it is found that such summary data can still filter out a significant number of cache snoop operations, thereby giving significant energy savings.

In one embodiment, each time a cache's indication circuitry operates, it produces indications for only a subset of the segments of that cache. However, in one embodiment, the lookup procedure is performed simultaneously in respect of the entirety of a cache, and each operation of the indication circuitry produces an indication for every segment of the cache. As a result, the lookup procedure can be aborted, or avoided altogether, in respect of any segments whose associated indication indicates that the data the subject of the access request is definitely not stored in that segment, thereby producing significant power consumption savings.

The segments of the cache can take a variety of forms. However, in one embodiment, each segment comprises a plurality of cache lines.

In one embodiment, at least one cache is a set associative cache and each segment comprises at least part of a way of the cache. In one particular embodiment, each segment of that cache comprises a way of the cache, such that the indication circuitry produces an indication for each way of the cache, identifying whether the data the subject of the access request is either definitely not stored in that way, or is potentially stored within that way. Accordingly, in such embodiments, the snoop indication circuitry can be arranged to maintain information on a way-by-way basis, such that any notification issued to a cache to indicate that a snoop operation is required in connection with that cache can identify the individual ways of the cache to be subjected to that snoop operation.

In an alternative embodiment where at least one cache is a set associative cache, each segment of that cache comprises at least part of a set of the cache. Such an approach may be beneficial in a very highly set-associative cache where there may be a larger number of cache lines in each set. In one such embodiment, each set is partitioned into a plurality of segments. If that level of granularity is reflected in the content of the snoop indication circuitry, then the notifications issued by the cache coherency circuitry can identify which individual segments in the cache needs subjecting to the snoop operation.

The indication circuitry provided in association with each cache can take a variety of forms. However, in one embodiment, at least one indication circuitry comprises: guardian storage for storing said segment filtering data in the form of guarding data; and hash circuitry for performing a hash operation on the address portion in order to reference the guarding data to determine each said indication. When compared with some alternative forms of indication circuitry, indication circuitry arranged in such a manner can yield significantly improved accuracy, due to the application of a hash operation to an address portion in order to reference guarding data to determine each indication. In one particular embodiment, the guarding data in the guardian storage comprises a Bloom filter counter array for each segment, and the hash circuitry is operable from the address portion to generate at least one index, each index identifying a counter in the Bloom filter counter array for each segment. In one particular embodiment, the hash circuitry is arranged to generate a single index, since it has been found that the use of a single index rather than multiple indexes does not significantly increase the level of false hits. As used herein, the term "false hit" refers to the situation where the indication circuitry produces an indication that a data value may potentially be stored within an associated segment, but it later transpires that the data value is not within that segment.

The guardian storage can take a variety of forms. However, in one embodiment, for each segment the guardian storage comprises: counter circuitry having a plurality of counter entries, each counter entry containing a count value; and vector circuitry having a vector entry for each counter entry in the counter circuitry, each vector entry containing a value which is set when the count value in the corresponding counter entry changes from a zero value to a non-zero value, and which is cleared when the count value in the corresponding counter entry changes from a non-zero value to a zero value.

In accordance with such embodiments, the hash circuitry is arranged to generate from the address portion at least one index, with each index identifying a counter entry and associated vector entry. The hash circuitry is then operable whenever a data value is stored in, or removed from, a segment of the cache to generate from the address portion of the associated address said at least one index, and to cause the count value in each identified counter entry of the counter circuitry of the associated guardian storage to be incremented if the data value is being stored in that segment or decremented if the data value is being removed from that segment. The hash circuitry is further operable for at least some access requests to generate from the address portion of the associated address said at least one index, and to cause the vector circuitry of each of at least a subset of the guardian storages to generate an output signal based on the value in each identified vector entry, the output signal indicating if the data value of the access request is not stored in the associated segment.

The actual incrementing or decrementing of the relevant count value(s) can take place at a variety of times during the storage or removal process. For example, the relevant count value(s) can be incremented at the time of allocating a data value to the cache or at some time later when the actual data value is stored as a result of a linefill procedure. Similarly, the relevant count value(s) can be decremented at the time when a data value has been chosen for eviction from the cache, or at some later time when the data value is overwritten as part of the linefill process following the eviction.

When a cache's indication circuitry takes the above form, the content of the snoop indication circuitry can be derived in a variety of ways. However, in one embodiment, the snoop indication circuitry maintains a copy of the vector entries provided by each such indication circuitry. However, in an alternative embodiment, in order to reduce the amount of data retained within the snoop indication circuitry, the snoop indication circuitry maintains summary data derived from the vector entries provided by each such indication circuitry.

The summary data can take a variety of forms. However, in one embodiment, for each segment the vector entries in the corresponding vector circuitry are partitioned to form a plurality of groups and the summary data is derived for each group. In one particular embodiment, the summary data takes the form of a single bit for each such identified group. Further, considering the example where each segment represents a way of a set associative cache, then the vector entries pertaining to each way can be partitioned in the same manner with corresponding groups from each way forming a sub-matrix, and with summary data being derived for each sub-matrix. In one particular embodiment, the summary data for a particular sub-matrix will include a single bit of data for each way.

In such embodiments, the number of vector entries contained in each group is a design parameter that can be tuned. If it is desired to achieve more compact summary data, then the number of vector entries in each group can be selected to be a high number, but this will in turn reduce the accuracy of the summary data.

With a typical hash function, the individual vector entries making up each group may not correspond to sequential memory addresses, and as a result the summary data obtained from each group will not correspond to sequential addresses. However, in one particular embodiment, the hash operation performed by the hash circuitry is arranged such that each group contains vector entries pertaining to consecutive cache blocks in a memory region, such that the summary data enables the cache coherency circuitry to determine on a memory region by memory region basis whether a snoop operation needs to be performed in respect of the associated segment. Accordingly, in this particular embodiment, each group (or sub-matrix when considering corresponding groups pertaining to each way) are designed in such a way that they store vector entries for consecutive cache blocks in a memory region. Accordingly, by such an approach, it is possible to obtain summary data for a particular memory region thus enabling the cache coherency circuitry to determine on a memory region by memory region basis whether a snoop operation needs to be performed in respect of a particular segment of the cache. The size of the memory region can vary dependent on implementation. For example, in one embodiment each memory region may correspond to a memory page, whilst in other embodiments each region may be larger than a memory page.

As mentioned earlier, the indication circuitry associated with each cache can take a variety of forms. In one embodiment, at least one cache is a set associative cache, for that at least one cache each segment comprises a way of the cache, and the associated indication circuitry comprises: a partial tag store for storing said segment filtering data in the form of partial tag values, for each set a partial tag value being provided for each way of that set; the associated indication circuitry being arranged to identify from the address the set being accessed and to determine for each way, by comparing one or more tag bits of the address with the relevant partial tag value, whether the data is either definitely not stored in that way or is potentially stored within that way.

In accordance with such embodiments, the indication circuitry performs a direct comparison between one or a few bits of the tag portion of an address and the corresponding one or few bits of a tag value stored in association with each cache line. When compared with the earlier-mentioned embodiments where a hash operation is applied to an address portion in order to reference guarding data, this identified embodiment will typically only identify a smaller proportion of cache miss conditions, resulting in the overall accuracy being lower when compared with the earlier-mentioned embodiment employing a hash operation. Furthermore, when adopting the partial tag store approach, separate entries need to be provided for each cache line, with each lookup in the indication circuitry only providing an indication for a particular cache line in a particular way. As a result, such techniques are relatively inflexible. Nevertheless, by deriving the content of the snoop indication circuitry from the segment filtering data maintained by such indication circuitry, this can still provide a suitable mechanism for significantly reducing unnecessary snoop operations, thereby producing significant energy savings. In particular, in such embodiments the cache coherency circuitry can still issue notifications identifying on a way-by-way basis the ways of a cache that should be subjected to the snoop operation.

The manner in which the content of the snoop indication circuitry is derived from the content of such indication circuitry can take a variety of forms. However, in one embodiment, the snoop indication circuitry maintains a copy of the partial tag values. However, in an alternative embodiment, the snoop indication circuitry maintains summary data derived from the partial tag values.

In one embodiment, the cache coherency circuitry is located centrally and may be formed by a snoop control unit used to determine which access requests require the coherency operation to be performed, for any such accesses to then reference the snoop indication circuitry to determine whether any of the caches require subjecting to a snoop operation, and to then issue snoop requests to any such identified caches identifying the segments to be subjected to the snoop operation.

However, in an alternative embodiment, some of the above functionality of the cache coherency circuitry can be distributed so as to be provided more locally to each processing unit. In particular in one embodiment the cache coherency circuitry includes a snoop control unit and a plurality of coherency control units, each coherency control unit being associated with one of the processing units and its associated cache, and being arranged to determine which of the access requests issued by the associated processing unit should cause a coherency operation to be initiated by the snoop control unit. In such embodiments, a reduction in traffic received by the snoop control unit can be achieved, due to the filtering of access request performed by the coherency control units (the snoop control unit only being notified of those access requests that do require a coherency operation to be performed).

Viewed from a second aspect, a method of managing cache coherency in a data processing apparatus is provided. The data processing apparatus comprises a plurality of processing units for performing data processing operations requiring access to data in shared memory, each processing unit when access to data is required issuing an access request specifying an address in memory associated with that data, each processing unit having a cache associated therewith and comprising a plurality of segments for storing a subset of said data for access by that processing unit, each cache being responsive to at least a subset of the access requests issued by its associated processing unit to perform a lookup procedure, each cache having indication circuitry associated therewith containing segment filtering data, the indication circuitry being responsive to an address portion of the address to reference the segment filtering data to provide, for each of at least a subset of the segments, an indication as to whether the data is either definitely not stored in that segment or is potentially stored within that segment, the indications produced by the indication circuitry being used by the cache to affect the lookup procedure. The method comprises the steps of: providing cache coherency circuitry employing a cache coherency protocol to ensure data accessed by each processing unit is up-to-date; providing snoop indication circuitry associated with the cache coherency circuitry; deriving the content of the snoop indication circuitry from the segment filtering data of each said indication circuitry; for certain access requests, initiating a coherency operation during which the snoop indication circuitry is referenced to determine whether any of said caches require subjecting to a snoop operation; and for each cache for which it is determined a snoop operation should be performed, issuing a notification to that cache identifying the snoop operation to be performed.

In one particular embodiment, each said notification identifies the segments of the cache to be subjected to the snoop operation.

Viewed from a third aspect, a data processing apparatus comprises a plurality of processing means for performing data processing operations requiring access to data in shared memory means, each processing means for issuing, when access to data is required, an access request specifying an address in memory associated with that data; each processing means having a cache means associated therewith and comprising a plurality of segments for storing a subset of said data for access by that processing means, each cache means for performing a lookup procedure in response to at least a subset of the access requests issued by its associated processing means; each cache means having indication means associated therewith containing segment filtering data, the indication means for referencing, in response to an address portion of the address, the segment filtering data to provide, for each of at least a subset of the segments, an indication as to whether the data is either definitely not stored in that segment or is potentially stored within that segment, the indications produced by the indication means being used by the cache means to affect the lookup procedure; and cache coherency means for employing a cache coherency protocol to ensure data accessed by each processing means is up-to-date, the cache coherency means having snoop indication means associated therewith whose content is derived from the segment filtering data of each said indication means, for certain access requests the cache coherency means initiating a coherency operation during which the snoop indication means is referenced to determine whether any of said cache means require subjecting to a snoop operation, for each cache means for which it is determined a snoop operation should be performed, the cache coherency means issuing a notification to that cache means identifying the snoop operation to be performed.

DETAILED DESCRIPTION

Figure 1A:
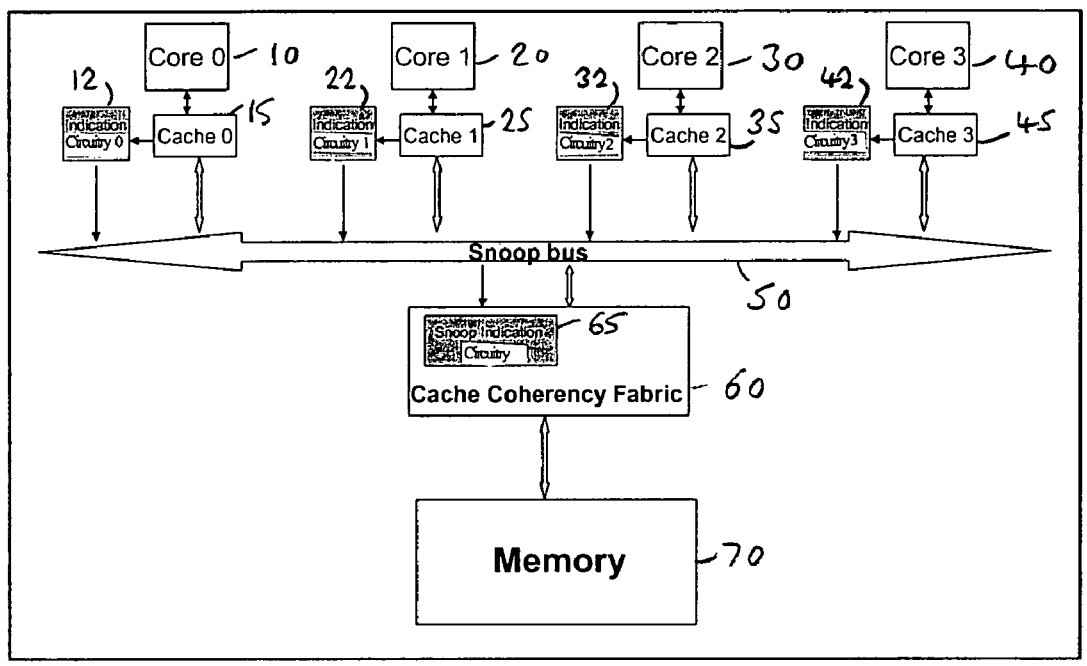
FIG. 1A is a block diagram of a data processing apparatus in accordance with one example embodiment.

FIG. 1A is a block diagram of a data processing apparatus in accordance with one example embodiment. The data processing apparatus comprises a plurality of processor cores 10, 20, 30, 40, each provided with its own local cache circuitry 15, 25, 35, 45, respectively. Each cache circuitry may comprise a single cache or may comprise multiple caches. For example the cache circuitry 15 provided in association with core 10 may comprise a level one cache and optionally may also comprise a level two cache. Often, a level one cache will be split to provide a separate level one instruction cache and a separate level one data cache. For a level two cache, it is more often the case that a unified cache structure is provided for storing both instructions and data. For the purposes of the present application, the term "data" will be used to refer generally to both instructions to be executed by a core and data manipulated by the core when executing those instructions.

When a processor core wishes to access data in memory 70, it issues an access request specifying an address of that data in memory. For cacheable access requests, a lookup operation is typically performed in the cache circuitry associated with that processor core in order to determine whether the data can be accessed locally in the cache. If so, the access proceeds with respect to the cache circuitry, whereas otherwise a cache miss occurs, causing a linefill request to be issued via the snoop bus 50 to memory 70 to cause a cache line's worth of data (including the data requested by the processor core) to be returned to the cache circuitry for storing therein.

Each of the caches 15, 25, 35, 45 can be considered as having a plurality of segments, and in accordance with the embodiment described in FIG. 1A, indication circuitry 12, 22, 32, 42 is provided in association with each cache, which based on filtering data maintained therein provides for each segment an indication as to whether the data the subject of an access request is either definitely not stored in that segment or is potentially stored within that segment. Typically, in situations where a particular cache circuitry 15, 25, 35, 45 comprises multiple caches (for example a level one instruction cache and a level one data cache, a level one cache and a level two cache, etc), then separate indication circuitry may be provided in association with each separate cache. However, it is not necessary to provide separate indication circuitry for each cache. For example, if a level 2 cache and level 1 cache are arranged to be fully inclusive, such that the data stored in the level 1 cache is a subset of the data stored in the level 2 cache, then one indication circuitry associated with the level 2 cache may be sufficient. Whenever a cacheable access request is issued by the associated processor core, the indication circuitry can be referenced and if it is determined with reference to the indication circuitry that the requested data is definitely not in the associated cache, then the cache lookup can be aborted (if it has already started) or can be avoided altogether (if the results from the indication circuitry are produced prior to initiating the lookup). This can provide significant energy savings with respect to the cache lookups performed when processing access requests issued by the processor cores 10, 20, 30, 40.

The memory 70 may be entirely formed as shared memory, or alternatively may be viewed as consisting of a number of memory regions, with at least one of those regions being a shared memory region in which the processors 10, 20, 30, 40 can store data that is sharable amongst those processors. Further, the memory 70 may comprise one or more hierarchical levels of memory within the memory system, and accordingly may include one or more levels of cache memory shared between the processors. Since the processor cores 10, 20, 30, 40 share access to memory 70, it is important to ensure that each processor will access up-to-date data when seeking to access data in memory. In particular, if a processor core's access request is to be serviced by its local cache circuitry, then it needs to be ensured that the copy maintained by the local cache circuitry is up-to-date.

Accordingly, in association with the snoop bus 50, cache coherency fabric 60 is provided which applies a cache coherency protocol in order to ensure that the data held in the various local caches 15, 25, 35, 45 is kept up-to-date. In particular, the cache coherency fabric 60 will ensure that when one processor updates data in its local cache, any copies of that data in the caches associated with the other processors will either be appropriately updated or invalidated in those caches to ensure coherency. There are a number of known cache coherency protocols which can be applied by the cache coherency fabric 60, for example the MESI cache coherency protocol or the MOESI cache coherency protocol.

When an access request is issued by a processor core, the cache coherency fabric 60 will be notified of that access request. For certain types of access request, the cache coherency fabric 60 will initiate a coherency operation. In particular, in one embodiment, each time a cache miss occurs on a read access request to shared data, or whenever a write access request is issued in respect of shared data, the cache coherency fabric 60 will initiate such a coherency operation. In a typical system, this will result in notifications (also referred to herein as snoop requests) being issued to each of the other caches in the system to cause those caches to perform a snoop operation in order to determine whether any of those caches store data at the address specified by the access request. The actions taken by each cache upon detection of such data will then vary dependent on the cache coherency protocol being used, but will typically involve data either being appropriately updated within the cache or else invalidated in order to ensure coherency.

In accordance with example embodiments, snoop indication circuitry 65 is provided within the cache coherency fabric 60 whose content is derived from the filtering data maintained within each indication circuitry 12, 22, 32, 42. In particular, as will be discussed in more detail later, the snoop indication circuitry 65 will either maintain a copy of at least part of the filtering data maintained by the indication circuitry 12, 22, 32, 42, or will store summary data derived from the contents of the indication circuitry 12, 22, 32, 42. Whenever the cache coherency fabric 60 determines that a coherency operation is required, it references the snoop indication circuitry 65 to determine whether any of the caches require subjecting to a snoop operation. Due to the nature of the filtering data in the indication circuitry, the snoop indication circuitry 65 can determine for each cache whether the data is either definitely not in that cache (and accordingly a snoop operation is not required) or may be in that cache (in which case a snoop operation is required). Further, this information can be provided on a segment-by-segment basis such that any snoop request issued to a particular cache can typically identify the individual segments within the cache that should be subjected to a snoop operation. As a result, significant snoop energy savings can be achieved by both reducing the number of snoop requests that need to be issued to the various caches 15, 25, 35, 45, and also by restricting any required snoop operations to particular identified segments of a cache, thereby avoiding the entirety of the cache being subjected to the snoop operation.

In one particular embodiment, it is assumed that each segment of the cache for which the indication circuitry can provide indication data corresponds to a way of the cache, each cache being formed as an n-way set associative cache. Hence, the indication circuitry 12, 22, 32, 42 associated with each cache 15, 25, 35, 45 provides a way filtering technique for filtering access requests on a per-way basis. Further, the snoop indication circuitry then has its contents derived from the filtering information maintained by the various indication circuitry 12, 22, 32, 42, thereby allowing snoop request filtering to be performed on a per-way basis.

Typically the above described snoop operations that result from the coherency operation performed by the cache coherency fabric are performed in caches storing data values rather than instructions (i.e. data caches or unified caches), since write accesses are performed in respect of data values but not generally in respect of instructions (with the exception of self-modifying code). Thus instruction caches are not typically subjected to snoop operations and accordingly the snoop indication circuitry does not typically need to keep a copy of any filtering information stored in indication circuitry associated with an instruction cache. Further, when the cache circuitry 15, 25, 35, 45 comprises multiple levels of cache, and those multiple levels of cache are fully inclusive, the snoop indication circuitry of one embodiment only needs to keep a copy or summary of filtering information stored in indication circuitry associated with the final level of cache, e.g. the level 2 cache for the example where a level 1 data cache and a level 2 cache are provided. If instead the multiple levels of cache are not fully inclusive, then the snoop indication circuitry of one embodiment needs to keep a copy or summary of filtering information stored in the indication circuitry associated with each level of cache.

In the embodiment of FIG. 1A, the cache coherency fabric 60 is located centrally and may be formed by a snoop control unit used to determine which accesses require the coherency operation to be performed, for any such accesses to then reference the snoop indication circuitry 65 to determine whether any of the caches require subjecting to a snoop operation, and to then issue snoop requests to any such identified caches identifying the segments to be subjected to the snoop operation.

Figure 1B:
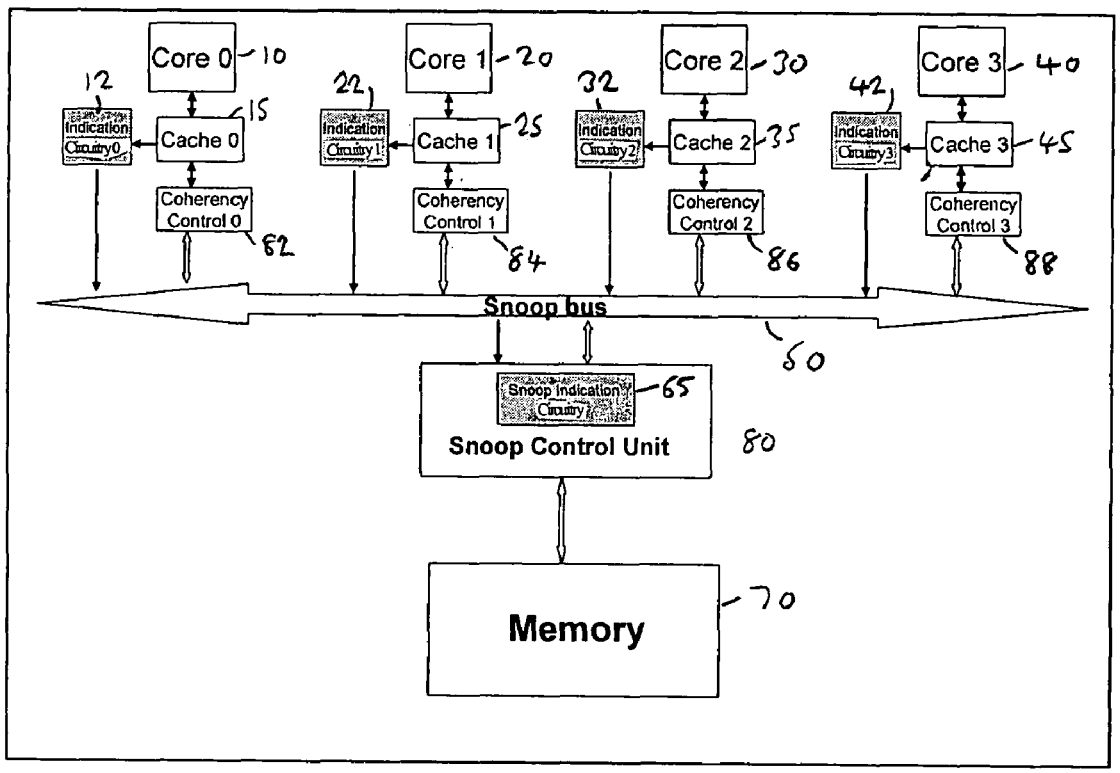
FIG. 1B is a block diagram of a data processing apparatus in accordance with another example embodiment.

However, in an alternative embodiment, some of the above functionality of the cache coherency fabric 60 can be distributed so as to be provided more locally to each processor core 10, 20, 30, 40, thereby reducing traffic over the snoop bus 50. In particular, FIG. 1B illustrates one such embodiment where the functionality of the cache coherency fabric is provided by the central snoop control unit 80 in combination with the distributed coherency control units 82, 84, 86, 88. Each coherency control unit determines for the access requests issued by the associated processor core whether those accesses require a coherency operation to be performed, taking into account the relevant cache coherency protocol being employed. If for a particular access request the relevant coherency control unit determines that a coherency operation is required, it notifies the snoop control unit 80 which then performs the remainder of the steps described above in connection with FIG. 1A, namely referencing the snoop indication circuitry 65 to determine whether any of the caches require subjecting to a snoop operation, and then issuing snoop requests to any such identified caches identifying the segments to be subjected to the snoop operation.

By such an approach the amount of traffic over the snoop bus 50 can be reduced because the requests are filtered locally by the relevant coherency control unit so that the snoop control unit 80 is only advised of access requests that do require a coherency operation to be performed.

Figure 2:
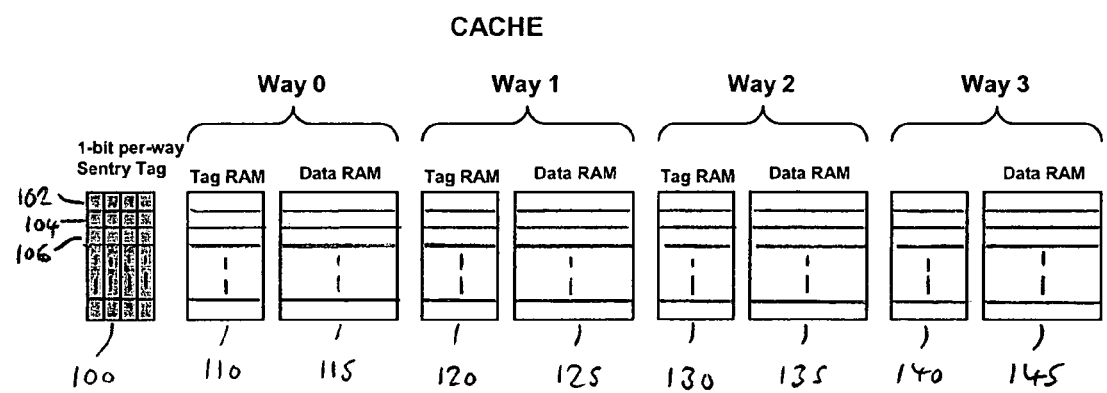
FIG. 2 is a diagram schematically illustrating a sentry tag scheme that may be used to form the indication circuitry of FIG. 1A or 1B in accordance with one example embodiment.

The way filtering technique employed by the indication circuitry 12, 22, 32, 42 can take a variety of forms. One known technique for providing such indication circuitry is described as a sentry tag technique, the "sentry tag" scheme having been described by Y.-Jen Chang et al in their article "Sentry Tag: An Efficient Filter Scheme for Low Power Cache", Australian Computer Science Communications, 2002. This scheme uses a filter to prevent access to all ways of the cache during an access. The scheme is generally illustrated in FIG. 2 for the example of a four-way set associative cache. As can be seen, each way of the cache has a tag RAM portion 110, 120, 130, 140 for storing tag values for each of a number of cache lines, and a data RAM portion 115, 125, 135, 145 for storing data forming a sequence of cache lines. The sentry tag 100 keeps one or more bits from the tag value, and in the embodiment illustrated in FIG. 2 contains one bit of the tag value per way. Hence, if a tag value comprises n bits, n−1 bits will be stored in the tag RAM entry and one bit will be stored in the sentry tag 100.

Each set of the cache will include a cache line in each of the ways, and accordingly it can be seen that each set is schematically illustrated in FIG. 2 by a horizontal line extending through each of the four ways. Accordingly, the entry 102 in the sentry tag 100 pertains to a first set, and comprises a tag bit for each of the four ways in that set. Similarly, the entries 104, 106 provide one bit per way for each of two further sets of the cache.

When an access request is received by the cache, a lookup is first performed in the sentry tag 100 in order to see if a match is detected. Accordingly, a set portion of the address is used to identify a particular entry in the sentry tag 100, and then the relevant one bit (the sentry bit) of the tag portion of the address is compared with each of the one bit entries per way in that sentry tag entry. In one embodiment, the sentry bit is selected to be the next bit after the set indexing bits in the address. If the sentry bit matches the sentry bit of any way in the sentry tag storage 100, then a further lookup in the main tag RAM for the relevant way is performed in order to finalise the search. If the sentry tag bit does not match for a particular way, then no further lookup is necessary in the main tag RAM for that way. Hence it can be seen in this embodiment that the sentry tag storage 100 forms the indication circuitry for such a cache.

A similar technique to the sentry tag scheme is the "way-halting" scheme described by C Zhang et al in the article "A Way-Halting Cache for Low-Energy High-Performance Systems", ISLPED'04, August 2004. In accordance with the way-halting scheme, the tag array is split into two in a level one cache. A smaller halt tag array keeps the lower four bits of tags in a fully-associative array whilst the rest of the tag bits are kept in the regular tag array. When there is a cache access, the cache set address decoding and the fully-associative halt tag lookup are performed simultaneously. For a given way, further lookup in the regular tag array is halted if there is no halt tag match at the set pointed to by the cache index. Accordingly, it will be appreciated that the way-halting scheme is in essence the same as the sentry tag scheme, and accordingly will not be discussed further herein. In particular, the following comments and discussion provided in respect of the sentry tag scheme could also in an alternative embodiment apply to indication circuitry arranged to implement the way-halting cache scheme.

Figure 3:
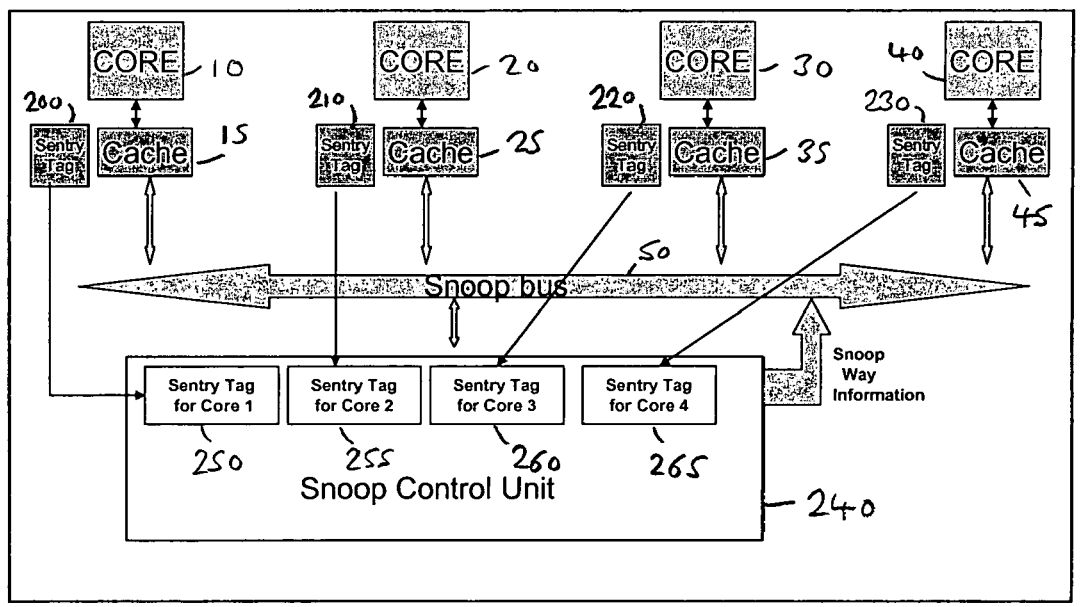
FIG. 3 illustrates how the sentry tag information is replicated within the snoop control unit to provide snoop indication circuitry in accordance with one example embodiment.

FIG. 3 illustrates a particular embodiment of the present invention, where a copy of the sentry tag information is created and stored within the snoop control unit 240 forming the cache coherency fabric 60 of FIG. 1A. Hence, each of the caches 15, 25, 35, 45 has a sentry tag storage 200, 210, 220, 230 associated therewith forming the indication circuitry discussed earlier with reference to FIG. 1A. For each cache in the multi-core system, a duplicate copy of the sentry tag information is stored in the snoop control unit 240 to form the storage elements 250, 255, 260, 265. These copies of the various sentry tag contents form the snoop indication circuitry 65 of FIG. 1A in such embodiments. If for a particular access request issued by one of the processor cores 10, 20, 30, 40, the snoop control unit (SCU) 240 determines that a coherency operation should be performed, then the set identified by the address of the access request is determined, and a lookup is performed by the SCU 240 simultaneously in each of the sentry tag copies 250, 255, 260, 265 associated with caches of the other processor cores (i.e. the lookup is performed in all sentry tag copies other than the one associated with the cache of the processor core issuing the access request). If the relevant sentry tag entry in a particular sentry tag copy 250, 255, 260, 265 indicates that for the set in question none of the cache ways in the associated cache contain the address being snooped, then no snoop request will be issued to that cache. If the sentry tag lookup indicates that some of the cache ways do not contain the address but some may do, then only the ways that cannot be safely indicated as not containing the address need to be subjected to a snoop operation. Accordingly, a snoop request will be issued to the corresponding cache identifying the ways of the cache that need to be subjected to the snoop operation.

In one embodiment, the way information regarding the ways to be snooped is output onto the snoop bus 50 so that when the relevant cache is subjected to the snoop operation, those identified ways are disabled so as not to participate in the tag comparisons performed during the snoop operation. Such an approach hence enables a significant reduction in snoop energy consumption, both through the avoidance of issuing a snoop request to any cache where the associated sentry tag copy stored in the SCU 240 safely indicates that the snoop address is not present in that cache, and also for a cache that does require subjecting to a snoop operation identifying the particular ways that need to be subjected to the snoop operation, thereby avoiding all ways being subjected to the snoop operation within that cache.

In one particular embodiment, when adopting the above mentioned scheme, if a particular cache has only certain of its ways subjected to the snoop operation, the local sentry tag storage 200, 210, 220, 230 associated with that cache is bypassed when the snoop operation is performed, as the copy of the sentry tag 250, 255, 260, 265 in the SCU 240 has already been subjected to a lookup. This means that the local processor core 10, 20, 30, 40 can still access the local sentry tag storage 200, 210, 220, 230 while a snoop request is being performed in respect of the tag RAMs of the cache, thereby enabling an overlapping of two different requests within the cache, namely a local access request issued by the associated processor core and a snoop request issued from the SCU 240. This can hence improve processor performance by reducing the impact of snoop requests on a local processor's performance.

Figure 4:
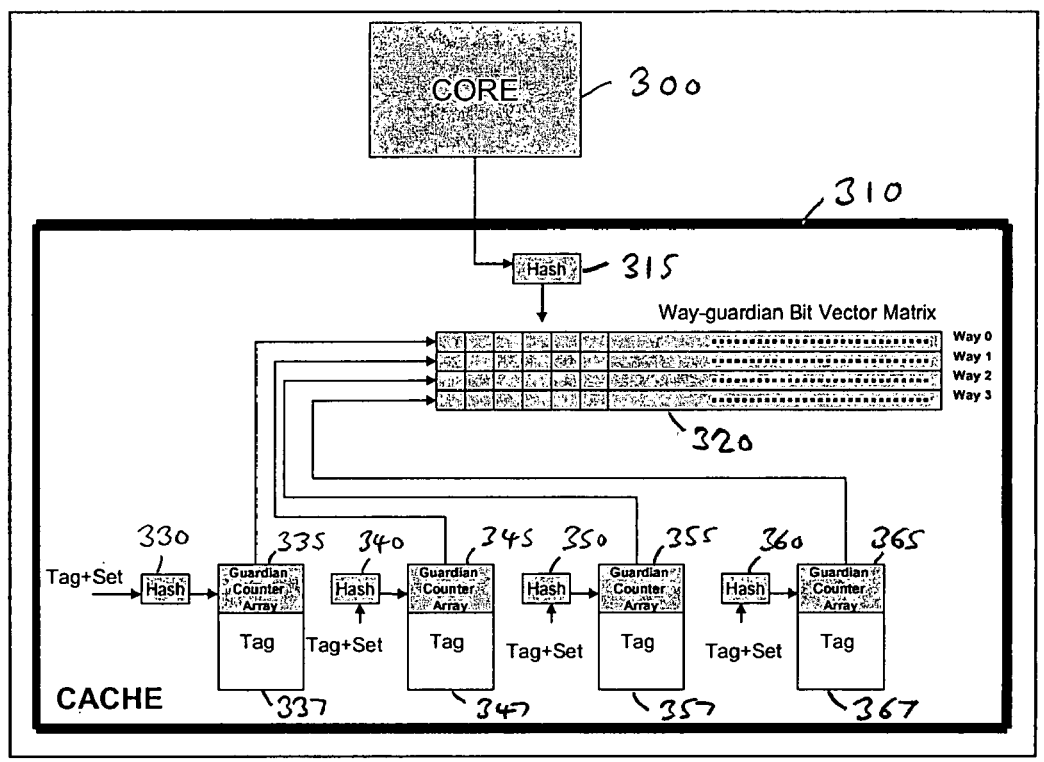
FIG. 4 is a diagram schematically illustrating a way guardian filter mechanism that may be employed to form the indication circuitry of FIG. 1A or 1B in accordance with one example embodiment.

As an alternative to the above-mentioned sentry tag or way halting schemes, the indication circuitry 12, 22, 32, 42 of FIG. 1A or 1B can in an alternative embodiment be arranged to employ way guardian filters. FIG. 4 shows a typical single-core system with a way guardian filter mechanism employed within the cache 310. Such a way guardian filtering mechanism is described in detail in commonly-assigned co-pending PCT application no. PCT/GB06/000795. The entire contents of PCT application no. PCT/GB06/000795, filed on 6 Mar. 2006, designating the US, and filed as a US national stage application under 35 USC 371, on Sep. 4, 2008 and assigned Ser. No. 12/224,725, are explicitly incorporated herein by reference. Further, a copy of the embodiment description of that PCT patent application is included at the end of the embodiment description of the present application as Appendix 1.

As shown in FIG. 4, each way of the cache has a guardian counter array 335, 345, 355, 365 associated therewith that tracks the cache addresses written into or evicted from that way. When a cache linefill occurs in a particular way, the cache address (in one particular embodiment the tag and set portions of the address) is subjected to a hash operation 330, 340, 350, 360 in order to generate a smaller index into the guardian counter array 335, 345, 355, 365, respectively. The associated counter in the counter array is incremented upon such a linefill operation. Similarly, if there is a line eviction from a particular way of the cache, the associated counter in the counter array is decremented. When a counter becomes non-zero it sets an associated bit in a way vector maintained in the way guardian bit vector matrix 320. In particular, for an m-bit index output from the hash functions 330, 340, 350, 360, each way vector will have $2^m$ entries, and the index will identify the relevant entry to be set. Similarly, when a particular counter becomes zero, the associated bit in the way vector is reset.

When the core 300 accesses the cache, the way guardian vector matrix is first accessed using the hash function 315, which is the same as the hash function 330, 340, 350, 360. Hence, the tag and set portions of the specified address of the access request are hashed to form a smaller index identifying a particular entry in each of the way vectors. This results in a single bit being read out of the way-guardian bit vector matrix for each way. If the bit is zero, then this means that the cache line including data at the specified address is not present in that way, and accordingly there is no need to access that way of the cache (thus saving the energy that would otherwise be consumed in performing the lookup in that cache way). If in contrast the bit is set to a logic one value, then this means that that way may contain the required cache line, so a tag comparison for that way should be performed in the corresponding tag portion 337, 347, 357, 367 of the cache. Accordingly, only the ways whose bit vectors are set to a logic one value are accessed. If the relevant bits in all ways are zero, the cache definitely does not have the required cache line, and the cache access can be skipped, with the access request being sent directly to memory 70 thereby saving a significant amount of tag comparison energy that would otherwise be consumed. Previous studies have shown that, on average, a processor core needs to perform a lookup only in two ways for a four-way set associative cache.

Figure 5:
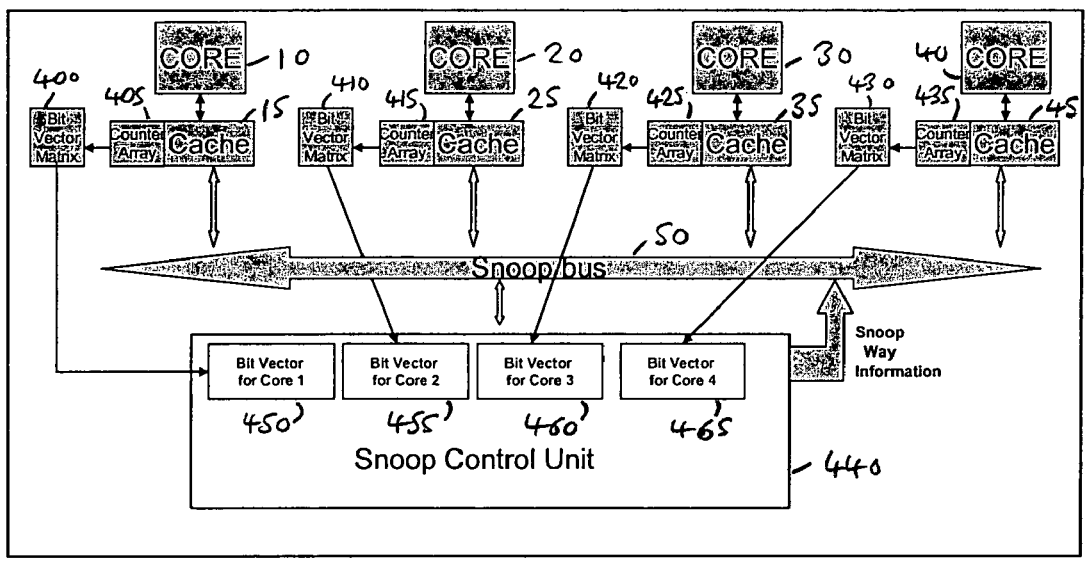
FIG. 5 schematically illustrates how the bit vector information of the way guardian technique of FIG. 4 may be replicated within the snoop control unit to provide snoop indication circuitry in accordance with one example embodiment.

FIG. 5 illustrates an embodiment of a snoop control unit 440 where each indication circuitry 12, 22, 32, 42 of FIG. 1A is formed by the bit vector matrix and counter array mechanism of FIG. 4. Accordingly, each cache 15, 25, 35, 45 has associated bit vector matrix and counter array storage 400, 405, 410, 415, 420, 425, 430, 435. In accordance with the embodiment shown in FIG. 5, copies 450, 455, 460, 465 of each bit vector matrix 400, 410, 420, 430 are maintained within the snoop control unit 440 in order to form the snoop indication circuitry 65 of FIG. 1A. When the SCU 440 determines that a coherency operation is required, the relevant cache set is identified from the address of the access request, and all bit vector matrices (other than the one associated with the cache of the processor issuing the access request) are simultaneously subjected to a lookup for the relevant cache set with the same hash function being employed to generate from the tag and set portions of the address the required index into the bit vectors. If a particular bit vector matrix copy 450, 455, 460, 465 indicates that none of the cache ways of the associated cache contain the address specified by the access request, then the corresponding cache is not subjected to a snoop operation, and accordingly no snoop request is issued to that cache. If however a particular bit vector matrix indicates that some of the cache ways do not contain the address but some may do, then only the ways that cannot be safely indicated by the contents of the bit vector matrix need to be subjected to the snoop operation. Accordingly, a snoop request is issued to the corresponding cache identifying the particular ways to be subjected to the snoop operation. This way information can be output on the snoop bus 50 so that when the relevant cache is snooped, those identified ways are disabled so as not to participate in the tag comparisons within that cache, thereby further reducing energy consumption.

In a similar way to that described earlier with reference to the sentry tag scheme, when only certain ways of a cache are subjected to the snoop operation, the local bit vector matrix 400, 410, 420, 430 can be bypassed, thereby allowing the local core 10, 20, 30, 40 to still have access to the local bit vector matrix while a snoop operation is being performed with reference to the tag RAMs of certain ways of the cache, thereby allowing two different types of request to be overlapped within the cache.

If the storage area budget required to keep either replicated sentry tags or replicated bit vector matrices in the SCU 240, 440, respectively is constrained, then in one embodiment it is possible to generate and store within the SCU a summary of the sentry or bit vector matrix information, rather than keeping an entire replica of that data.

Figure 6:
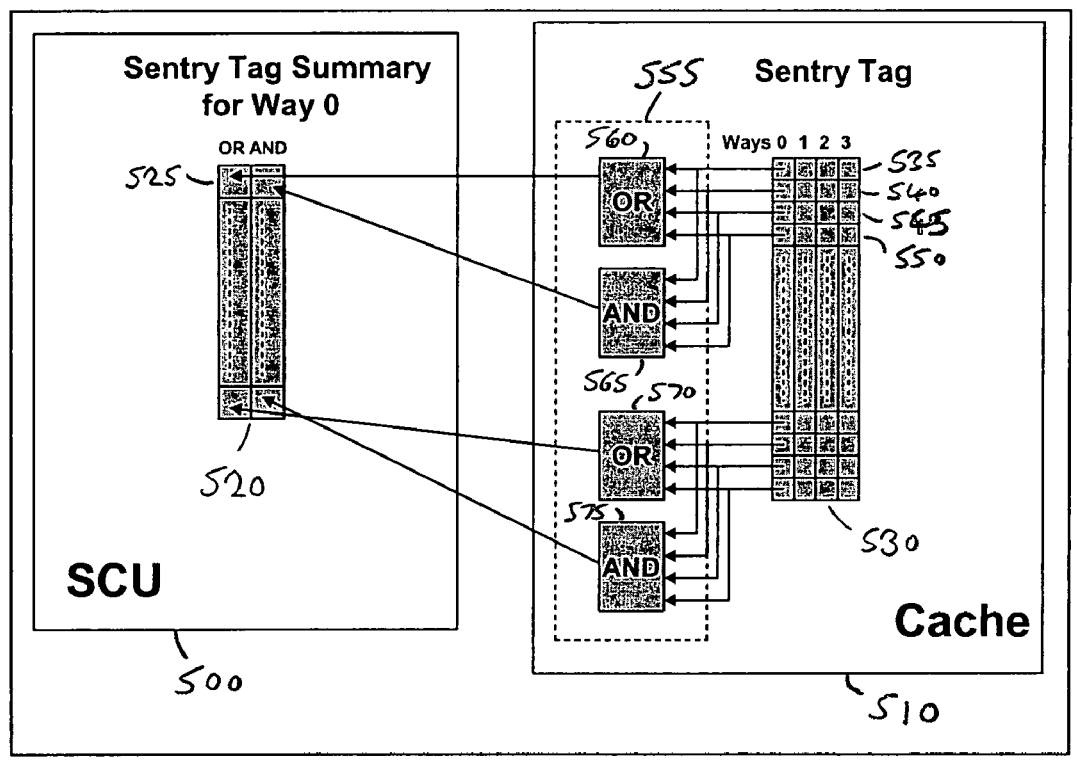
FIG. 6 is a diagram schematically illustrating summary generation circuitry that may be employed when using the sentry tag scheme in order to produce sentry tag summary information for the snoop indication circuitry in accordance with one example embodiment.

FIG. 6 illustrates one technique for generating sentry tag summary information for embodiments where the indication circuitry 12, 22, 32, 42 of FIG. 1A or 1B comprise sentry tag storage elements. As shown in FIG. 6, the sentry tag storage 530 for a particular cache 510 has a number of entries 535, 540, 545, 550, one entry for each set of the cache, with those entries containing a single bit for each way, as discussed earlier with reference to FIG. 2. Summary generation circuitry 555 is then used to generate sentry tag summary information. In particular, FIG. 6 illustrates the summary generation circuitry 555 provided for way zero and the corresponding sentry tag summary 520 produced for way zero and retained within the SCU 500. Similar summary generation circuitry will be provided for the other three ways of the cache and will give rise to a similar summary structure within the SCU 500. As can be seen from FIG. 6, the sentry tag bits belonging to multiple cache sets, in this particular case four cache sets, are coalesced into two-bit information. The first bit of this information is formed by subjecting the four bits for the four cache sets to a logical OR operation using OR circuitry 560, 570, and the second bit is then formed by performing a logical AND operation in respect of the same groups of four bits using the AND circuitry 565, 575. The resultant two-bit information is kept as a two-column array, where each entry 525 contains two bits of information relating to a particular group of four cache sets. This resultant sentry tag summary structure 520 is more compact than would be the case if merely the sentry tag storage 530 were replicated within the SCU 500. Whenever an update is made to the sentry tag storage 530, the change will be reflected in the sentry tag summary array in the SCU 500 to keep it up-to-date, although it will be appreciated that some changes to the sentry tag storage contents will not result in any actual change in the sentry tag summary contents.

When the SCU 500 determines that a coherency operation is required, then in a similar manner to the replicated sentry tag scheme discussed earlier with reference to FIG. 3, all sentry tag summary arrays (other than the one associated with the cache of the processor core issuing the access request) are looked up in parallel. Since multiple cache sets are coalesced into a single entry, the low-order bits from the set bits in the address specified by the access request need to be ignored when indexing the sentry tag summary arrays. For instance, if four cache sets are coalesced, then the two low-order bits from the set bits in the address are ignored when indexing the array. Within a single sentry tag summary array both the OR and the AND columns are subjected to a lookup for each way. If the sentry tag bit in the address is zero, the associated cache way will only be subjected to a snoop operation if both the OR and the AND bits are zero or if the OR bit is one and the AND bit is zero. If the sentry tag bit in the address is one, then the associated cache way will only be subjected to the snoop operation when both the OR and AND bits are one or the OR bit is one and the AND bit is zero. The following Tables 1 and 2 below illustrate the significance of the OR and AND bits, and the corresponding snoop actions that are initiated:

TABLE 1

| OR | AND | Meaning |
|---|---|---|
| 0 | 0 | All 0s |
| 1 | 1 | All 1s |
| 1 | 0 | 0s and 1s together |
| 0 | 1 | Impossible to occur |

TABLE 2

| Sentry Tag Bit in Address | OR | AND | Actions |
|---|---|---|---|
| 0 | 0 | 0 | Way Snoop |
| 0 | 1 | 1 | No Snoop |
| 0 | 1 | 0 | Way Snoop |

TABLE 2-continued

| Sentry Tag Bit in Address | OR | AND | Actions |
|---|---|---|---|
| 1 | 0 | 0 | No Snoop |
| 1 | 1 | 1 | Way Snoop |
| 1 | 1 | 0 | Way Snoop |

Such summary generation techniques can also be performed when the indication circuitry 12, 22, 32, 42 of FIG. 1A or 1B employ the way guardian filter techniques discussed earlier with reference to FIGS. 4 and 5. Each of the caches 15, 25, 35, 45 along with its associated bit vector matrix storage 400, 410, 420, 430 can be arranged to generate its own bit vector matrix summary and send that summary to the SCU regularly, so that there is a bit vector matrix summary array within the SCU representing each cache. The bit vector summary can be formed by ORing several consecutive bit vector entries for each way into a single bit as will be discussed in more detail with reference to FIG. 7, or alternatively the ORing function can also be performed both vertically and horizontally as will be described in more detail with reference to FIG. 8, in which case the way information content is lost but a much more compact bit vector summary is achieved.

Figure 7:
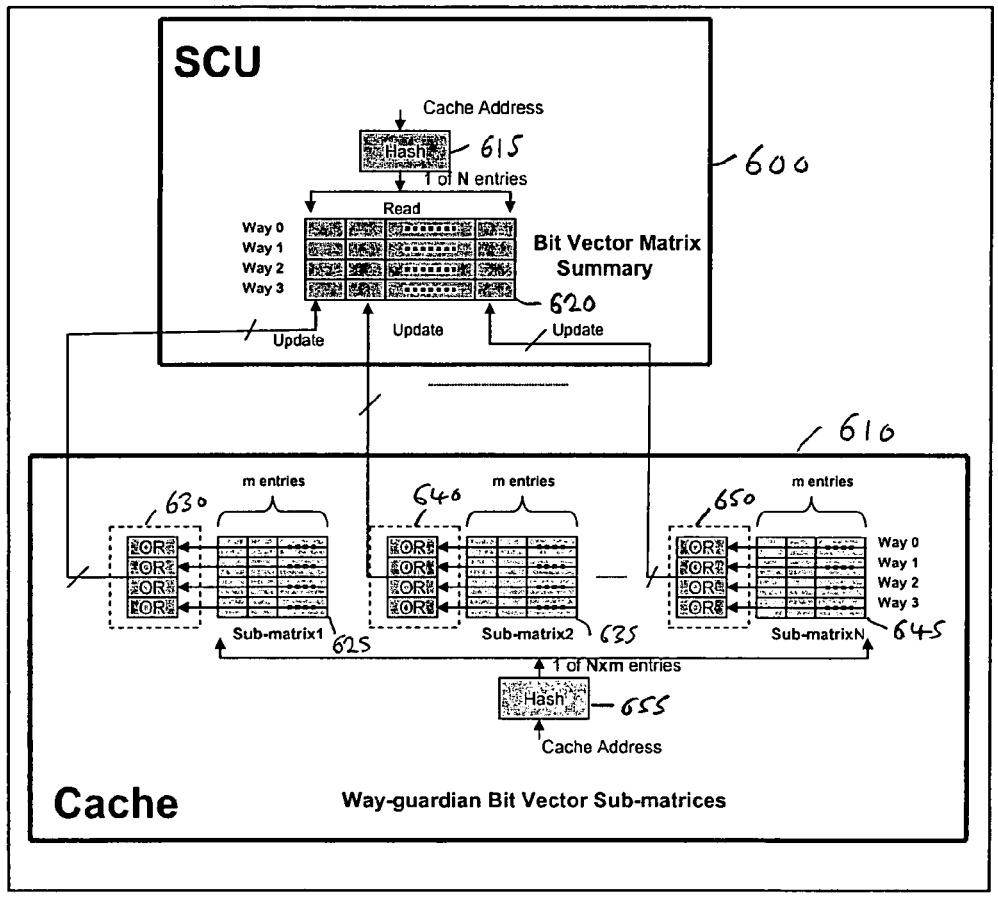
FIG. 7 schematically illustrates summary generation circuitry that may be employed when using a way-guardian filter mechanism in order to produce bit vector matrix summary information for the snoop indication circuitry in accordance with one example embodiment.

FIG. 7 illustrates a technique that can be used in one embodiment to generate the bit vector summary for a four-way cache associated with a processor core. For the cache 610, the way guardian vector matrix (see element 320 of FIG. 4) is divided into N sub-matrices of m bits per row. The parameter m is a design parameter that can be tuned. If it is desired to have a more compact bit vector summary table, m can be selected to be a higher number but this in turn will reduce the accuracy of the summary as more bits are ORed together (i.e. packed).

When a new cache line is written into or evicted from the cache 610, its associated way entry in the relevant way-guardian bit vector sub-matrix may need to be updated depending on whether the cache line's associated counter in the corresponding way-guardian counter array (see elements 335, 345, 355, 365 of FIG. 4) changes from one to zero or from zero to one. If it does, then the relevant bit vector sub-matrix entry for the cache line should be reset to zero or set to one, respectively. In that event, the hash function 655 receives the tag and set bits of the address and outputs an index identifying one of the entries for the relevant way in the way-guardian bit vector matrix to be updated (there will be N×m entries in total split between the N sub-matrices 625, 635, 645 illustrated in FIG. 7).

As can be seen in FIG. 7, each sub-matrix 625, 635, 645 has associated summary generation circuitry 630, 640, 650 comprising separate OR circuitry for each way for which the associated sub-matrix maintains bit vector data. Following a change to any of the m entries in a particular sub-matrix, the m-bits for each way represented by that sub-matrix are subjected to a logical OR operation in order to get a single summary bit value for each way, which represents several cache lines in that cache way. After this logical OR operation is performed, the summary data (one bit per way) is sent to the bit vector matrix summary 620 kept in the SCU 600.

From FIG. 7, it will be seen that the bit vector matrix summary 620 contains a single column for each sub-matrix 625, 635, 645 maintained by the cache 610, each column containing a single bit for each of the four ways.

Whilst in some embodiments the ORed m-bit summary can be sent to the SCU 600 every cycle, there is no need for this update to be performed every cycle, and in alternative embodiments the summary update can be generated and sent to the SCU only when there is a change between the previous and the new ORed value so that the amount of update traffic from the caches to the SCU 600 can be reduced.

As an example of the use of such a system, it will be assumed that there is a multi-core system with four processor cores, and with each core having a four-way set associative cache. When the SCU 600 determines for a particular access request issued by a particular core that a coherency operation is required, the SCU 600 will check the way bit vector summary tables 620 pertaining to the other three caches (i.e. the caches associated with the other three processor cores). If a summary table indicates that there may be a potential match, this means that the associated cache needs to be subjected to a snoop operation, and the way information in the summary table 620 enables a determination as to which ways of the cache should be subjected to the snoop operation. For instance, if only one summary bit out of all four ways for a cache is set, then the SCU only needs to identify in association with the snoop request it issues to that cache the particular way of the cache that needs to be snooped. The other three ways do not need to be snooped because the cache line in question is definitely known to not be in those ways. Similarly, if the relevant summary table 620 indicates that there is definitely no match (i.e. all summary bits are zero) then the cache does not need to be subjected to a snoop operation at all.

Figure 8:
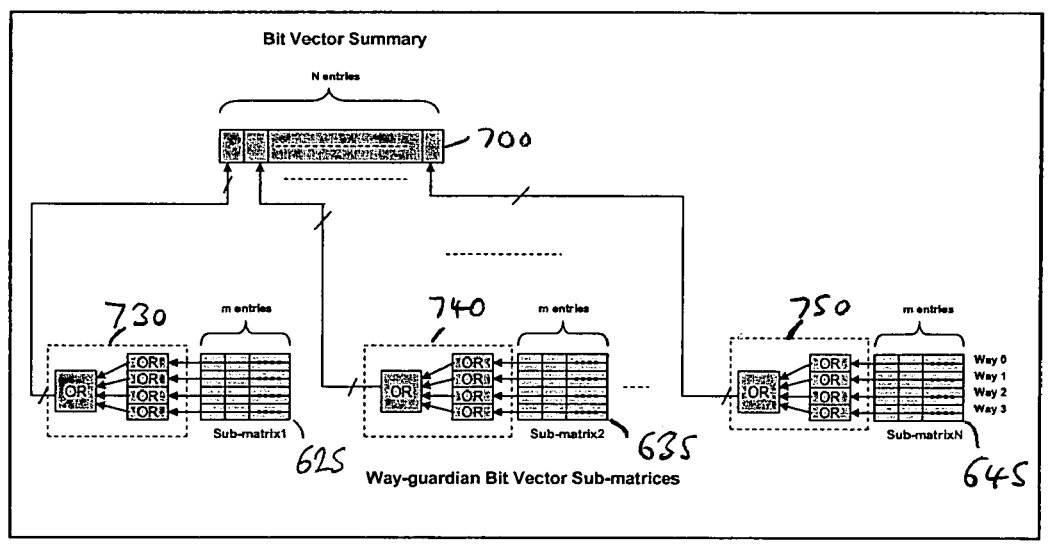
FIG. 8 illustrates an alternative form of summary generation circuitry that may be used with the apparatus of FIG. 7 in order to form a way-compacting bit vector matrix summary in accordance with one example embodiment.

FIG. 8 illustrates an alternative approach to that shown in FIG. 7, where the corresponding summary generation circuitry 730, 740, 750 associated with each sub-matrix 625, 635, 645 performs an OR operation in not only the horizontal direction but also the vertical direction. As a result, the bit vector summary table 700 only contains a single bit corresponding to each sub-matrix. Accordingly, such a way-compacting bit vector matrix summary 700 is produced by combining the way information on a cache set in order to get a single bit. In particular, all bits in the sub-matrix are ORed together to get a one-bit summary for the entire sub-matrix. This bit is then sent to the vector summary 700 maintained within the SCU 600. An advantage of such a scheme is that it is more compact and less costly in terms of hardware area. However, the way information is lost at this level, and therefore the selective way snoop filtering described previously cannot be achieved any more. As a result, in one embodiment, all of the cache ways will need to be snooped if the relevant summary bit has a logic one value. As an alternative, if the bit vector summary lookup identifies a logic one value, then prior to performing the snoop operation, a check could be performed by the SCU with reference to the way-guardian bit vector matrix maintained by each indication circuitry 12, 22, 32, 42 at the cache level. However, this would require a separate port from the SCU to each such indication circuitry and would delay the snoop operation process because of the two-stage access (one for the vector summary 700 maintained by the SCU and one for the way guardian bit vector matrix maintained by the relevant cache).

Figure 9:
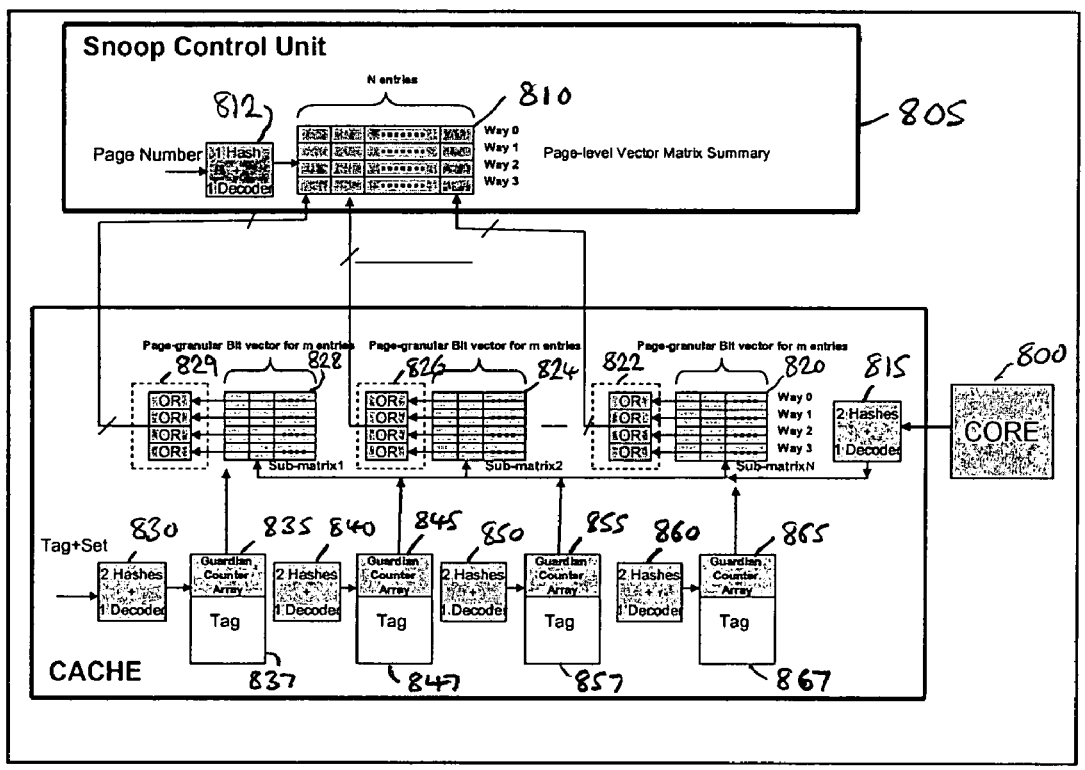
FIG. 9 illustrates how hash and decoder circuitry can be employed in one example embodiment to produce sub-matrices which each have entries pertaining to consecutive cache blocks in a memory page, such that a page-level bit vector summary can be produced within the snoop control unit in accordance with such embodiments.

Considering the embodiment of FIG. 7, the m-bits making up each row in the sub-matrices 625, 635, 645 represent several cache lines in a particular way. However, these cache lines in the particular way will not necessarily correspond to consecutive addresses. This is because the hash function 655 that indexes to the way guardian bit vector matrix will typically distribute consecutive addresses into non-consecutive locations in the matrix. As a result, the summary data produced for the bit vector matrix summary 620 will not relate to consecutive addresses. FIG. 9 illustrates an alternative scheme where each sub-matrix 820, 824, 828 is designed in such a way that it stores the bit vector for all consecutive cache blocks in a memory page (i.e. a per-page sub-matrix). In particular, as shown in FIG. 9, when the core 800 issues an access request, circuitry 815 performs two hash operations and a decode operation in order to identify an entry in a particular sub-matrix to perform a lookup in respect of. Similarly, with regard to the guardian counter arrays 835, 845, 855, 865 associated with each tag RAM 837, 847, 857, 867 of the four cache ways, the same combination of two hash functions and a decode function 830, 840, 850, 860 is performed to identify a particular entry in the corresponding guardian counter array to be incremented/decremented on linefills/evictions, respectively.

The summary data is then obtained in an analogous way to that discussed earlier with reference to FIG. 7, namely by employing summary generation circuitry 822, 826, 829 in association with each sub-matrix 820, 824, 828 to generate for each sub-matrix one bit per way to be stored within the vector matrix summary 810. However, due to the way the individual entries in each sub-matrix are arranged, the vector matrix summary table 810 now represents a page-level vector matrix summary.

When the SCU 805 determines from a particular access request that a coherency operation is required, only the page number specified by the address is used to perform a lookup in the page-level vector matrix summary using a single hash and decode function 812 as shown in FIG. 9. In particular, when the page number is hashed into and decoded into a specific location in the summary vector table 810, each way bit indicates whether there definitely is not or may be a cache block belonging to that page in the particular way.

Figure 10:
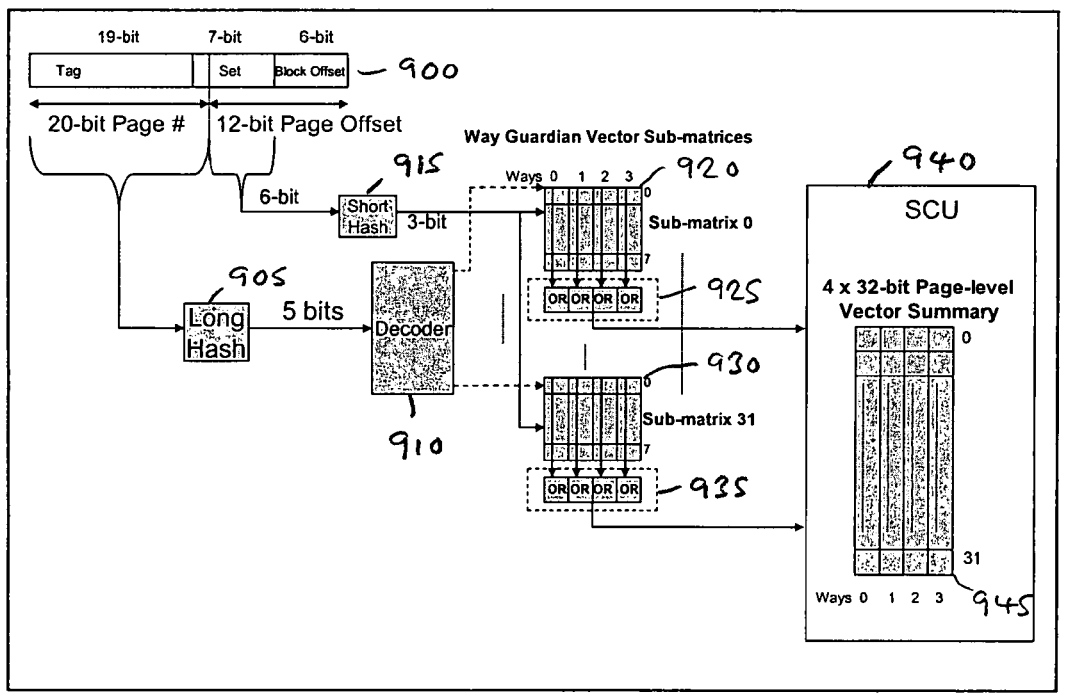
FIG. 10 illustrates how the tag and set portions of an address are processed by the hash and decoder circuitry of FIG. 9 in order to access the way guardian filter within the cache in accordance with one example embodiment.

When adopting an embodiment such as that shown in FIG. 9, the hash and decode functions performed when accessing guardian counter arrays or sub-matrices within the indication circuitry associated with a particular cache can operate as shown for example in FIG. 10. In particular, the hash function is split into two different hash functions, namely a long hash function 905 and a short hash function 915, and also an additional decoder stage 910 is performed after the long hash function 905. FIG. 10 describes the use of these two hash functions and decoder function in order to access a particular sub-matrix, but the same mechanism is also used to identify a particular counter entry within a guardian counter array.

The short and long hash functions as well as the decode function are shown in FIG. 10 by way of an example, and in that example it is assumed that there is a four-way 32 Kbyte cache with a 64 byte line size, a page size of 1 Kbyte and a bit vector size of 256 bits per way. The tag and set portions of the address are hashed into the guardian filter circuitry as shown in FIG. 10. In particular, the page number portion of the address, which is formed by the tag portion plus some bits from the set portion, is hashed to form an index to the decoder using the long hash function 905. Then, the decoder 910 routes the hash index into a specific sub-matrix so that page blocks belonging to a page will always go to the same sub-matrix. The remainder of the set bits are hashed using the short hash function 915 in order to form an index to be used as an offset to the sub-matrix addressed by the decoder 910.

When generating the summary information, each sub-matrix 920, 930 is ORed vertically by summary generation circuitry 925, 935, respectively, to form a single bit per way, with the thus-generated four summary bits being transferred into the page-level vector summary storage 945 in the SCU 940. The short and long hash functions shown in FIG. 10 can take a variety of forms, but will typically be some XOR-based hash functions.

Figure 11:
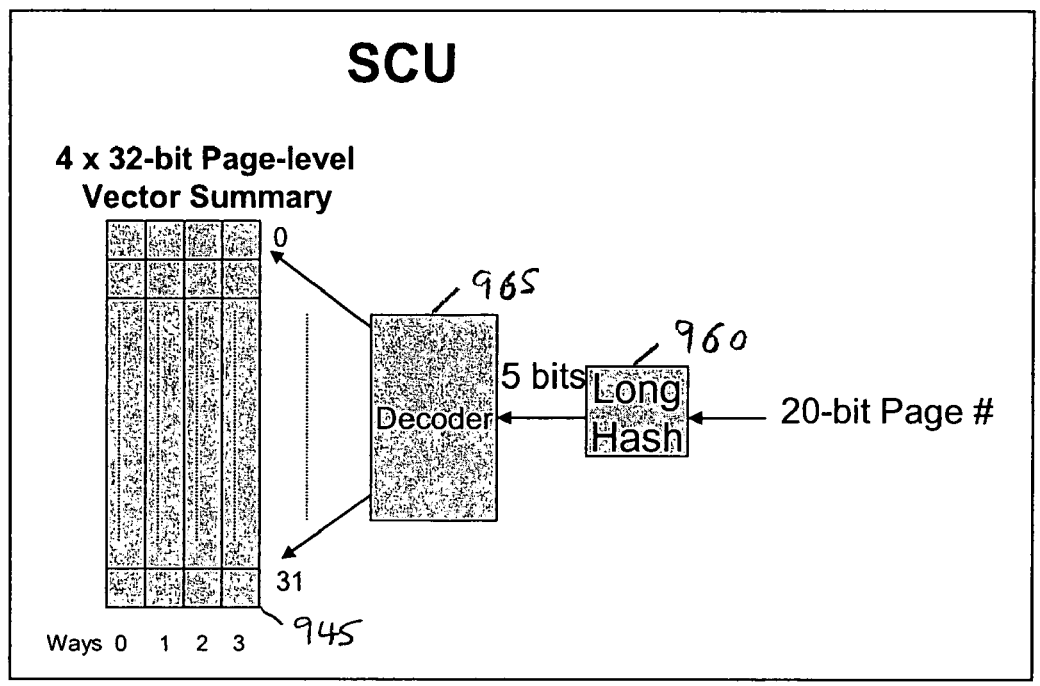
FIG. 11 illustrates the operation of the hash and decoder circuitry provided within the snoop control unit of FIG. 9 in accordance with one example embodiment.

FIG. 11 illustrates the operation of the hash and decode functions 812 within the SCU 805 of FIG. 9. When the SCU determines from a particular access request that a coherency operation is required, the page number of the address portion is passed through the long hash function 960 in order to generate an index that is then input to the decoder 965, the decoder then routing that index to one of the rows within the page-level vector summary 945 in order to identify a single bit per way that is then used in the earlier-described manner to determine on a per-way basis whether a snoop operation is required in association with the corresponding cache.

From the above described embodiments, it will be appreciated that such embodiments provide an effective mechanism for reducing snoop energy by making use of way filtering information that is already stored in association with each cache way. A variety of way filtering techniques can be used such as sentry tag, way halting and way-guardian filtering. Snoop indication circuitry is maintained in association with the SCU, and the contents of the snoop indication circuitry are derived from the way filtering information maintained locally in association with each cache. The snoop indication circuitry is then referenced when the SCU determines that a coherency operation is required, in order to identify which caches should be subjected to a snoop operation. Further, in embodiments where the way-by-way filtering information is maintained within the information stored in the snoop indication circuitry, it can be determined for any particular cache that does require subjecting to a snoop operation which individual ways of the cache should be subjected to the snoop operation, thereby further reducing snoop energy.

The hardware cost for implementing techniques in accordance with embodiments of the present invention is significantly less than that required by known techniques aimed at saving snoop energy. Further, as mentioned above, not only can the techniques of embodiments of the present invention perform per-cache snoop filtering, but can also perform "per-way within a cache" snoop filtering in order to further improve snoop energy savings. Furthermore, it has been found that the dynamic and leakage energy consumption of the extra hardware required to perform such snoop energy saving techniques is significantly less than the snoop energy savings that can be realised, thereby making this technique significantly more attractive than certain known prior art techniques.

Appendix 1 below is the text of the embodiment description of co-pending PCT application no. PCT/GB06/000795, and describes a way guardian filter mechanism that can be employed in association with a cache.

APPENDIX 1

Figure 12:
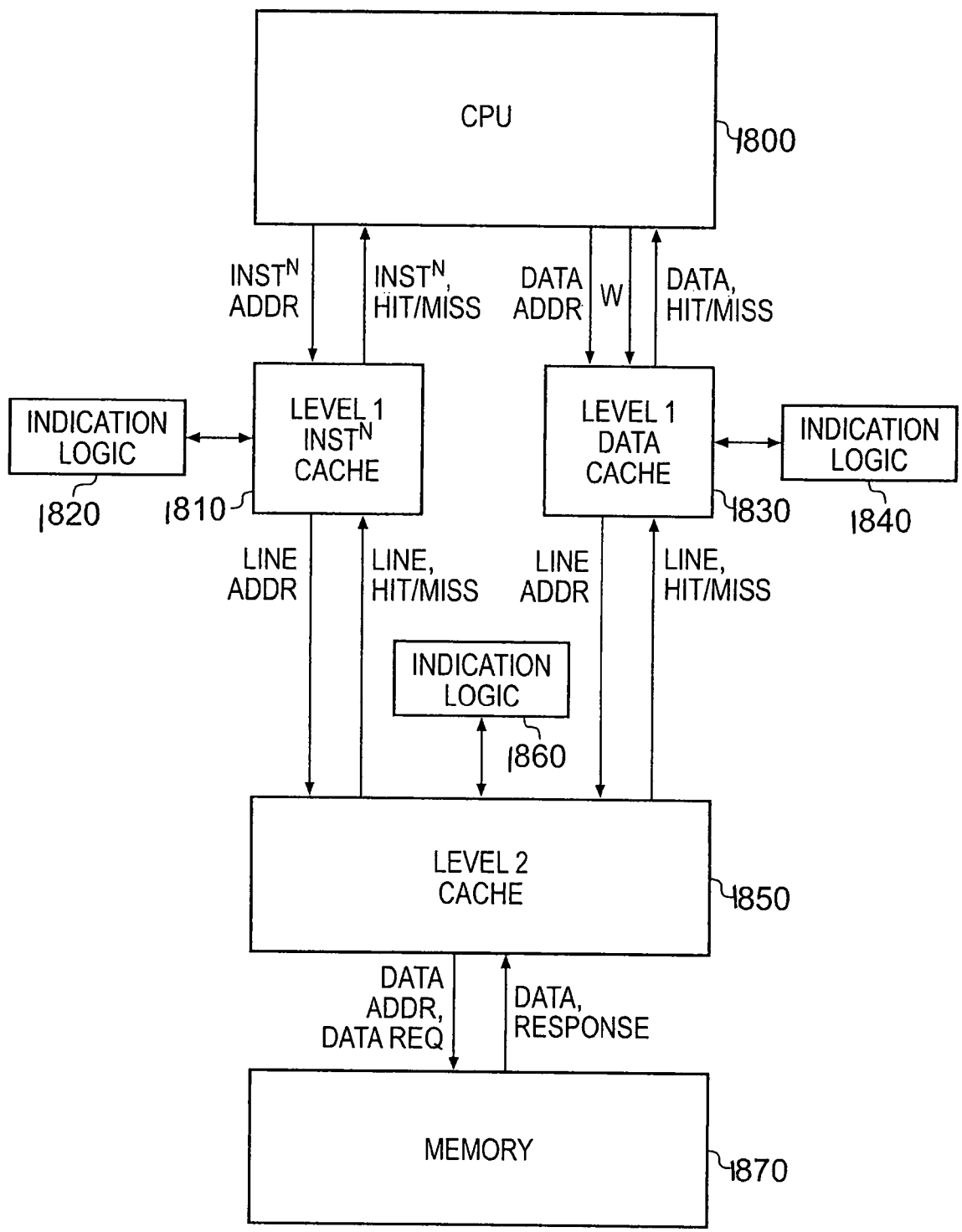
FIG. 12 is a block diagram of a data processing apparatus in accordance with one example embodiment.

FIG. 12 is a block diagram of a data processing apparatus in accordance with one embodiment. In particular, a processor in the form of a central processing unit (CPU) 1800 is shown coupled to a memory hierarchy consisting of level one instruction and data caches 1810, 1830, a unified level two cache 1850, and bulk memory 1870. When fetch logic within the CPU 1800 wishes to retrieve an instruction, it issues an access request identifying an instruction address to the level one instruction cache 1810. If the instruction is found in that cache, then this is returned to the CPU 1800, along with a control signal indicating that there has been a hit. However, if the instruction is not in the cache, then a miss signal is returned to the CPU, and the appropriate address for a linefill to the level one instruction cache 1810 is output to the level two cache 1850. If there is a hit in the level two cache, then the relevant line of instructions is returned to the level one instruction cache 1810 along with a control signal indicating a hit in the level two cache. However, if there is a miss in the level two cache 1850, then a miss signal is returned to the level one instruction cache 1810, and the line address is propagated from the level two cache 1850 to memory 1870. This will ultimately result in the line of instructions being returned to the level two cache 1850 and propagated on to the CPU 1800 via the level one instruction cache 1810.

Similarly, when execution logic within the CPU 1800 executes a load or a store instruction, the address of the data to be accessed will be output from the execution logic to the level one data cache 1830. In the event of a store operation, this will also be accompanied by the write data to be stored to memory. The level one data cache 1830 will issue a hit/miss control signal to the CPU 1800 indicating whether a cache hit or a cache miss has occurred in the level one data cache 1830, and in the event of a load operation which has hit in the cache will also return the data to the CPU 1800. In the event of a cache miss in the level one data cache 1830, the line address will be propagated on to the level two cache 1850, and in the event of a hit the line of data values will be accessed in the level two cache. For a load this will cause the line of data values to be returned to the level one data cache 1830 for storing therein. In the event of a miss in the level two cache 1850, the line address will be propagated on to memory 1870 to cause the line of data to be accessed in the memory.

Each of the caches can be considered as having a plurality of segments, and in accordance with the embodiment described in FIG. 12 indication logic can be provided in association with one or more of the caches to provide indications indicating whether the data value the subject of an access request is either definitely not stored in a particular segment or is potentially stored within that segment. In FIG. 12, indication logic 1820, 1840, 1860 are shown in association with each cache 1810, 1830, 1850, but in alternative embodiments the indication logic may be provided in association with only a subset of the available caches.

Whilst for ease of illustration the indication logic 1820, 1840, 1860 is shown separately to the associated cache 1810, 1830, 1850, respectively, in some embodiments the indication logic will be incorporated within the associated cache itself for reference by the cache control logic managing the lookup procedure in the relevant cache.

As will be discussed in more detail later, for each segment that the indication logic is to produce an indication in respect of, the indication logic is arranged to store guarding data for that segment, and further comprises hash logic which performs a hash operation on a portion of the address in order to reference that guarding data so as to determine the appropriate indication to output. Each indication will indicate whether the data value is either definitely not stored in the associated segment or is potentially stored within the associated segment. Hence, for an instruction address output by the CPU 1800 to the level one instruction cache 1810, the indication logic 1820 will perform a hash operation on a portion of that instruction address in order to reference the guarding data for each segment, and based thereon produce indications for each segment identifying whether the associated instruction is either definitely not stored in that segment of the level one instruction cache or is potentially stored within that segment. The indication logic 1840 associated with the level one data cache 1830 will perform a similar operation in respect of any data address output by the CPU 1800 to the level one data cache 1830. Similarly, the indication logic 1860 will perform an analogous operation in respect of any line address output to the level two cache 1850 from either the level one instruction cache 1810 or the level one data cache 1830.

The guarding data stored in respect of each segment is updated based on eviction and linefill information in respect of the associated segment. In one embodiment, each indication logic uses a Bloom filter technique and maintains guarding data which is updated each time a data value is stored in, or removed from, the associated segment of the relevant cache, based on replacement and linefill information routed to the indication logic from that segment. More details of an embodiment of the indication logic will be discussed in detail later.

Figure 13:
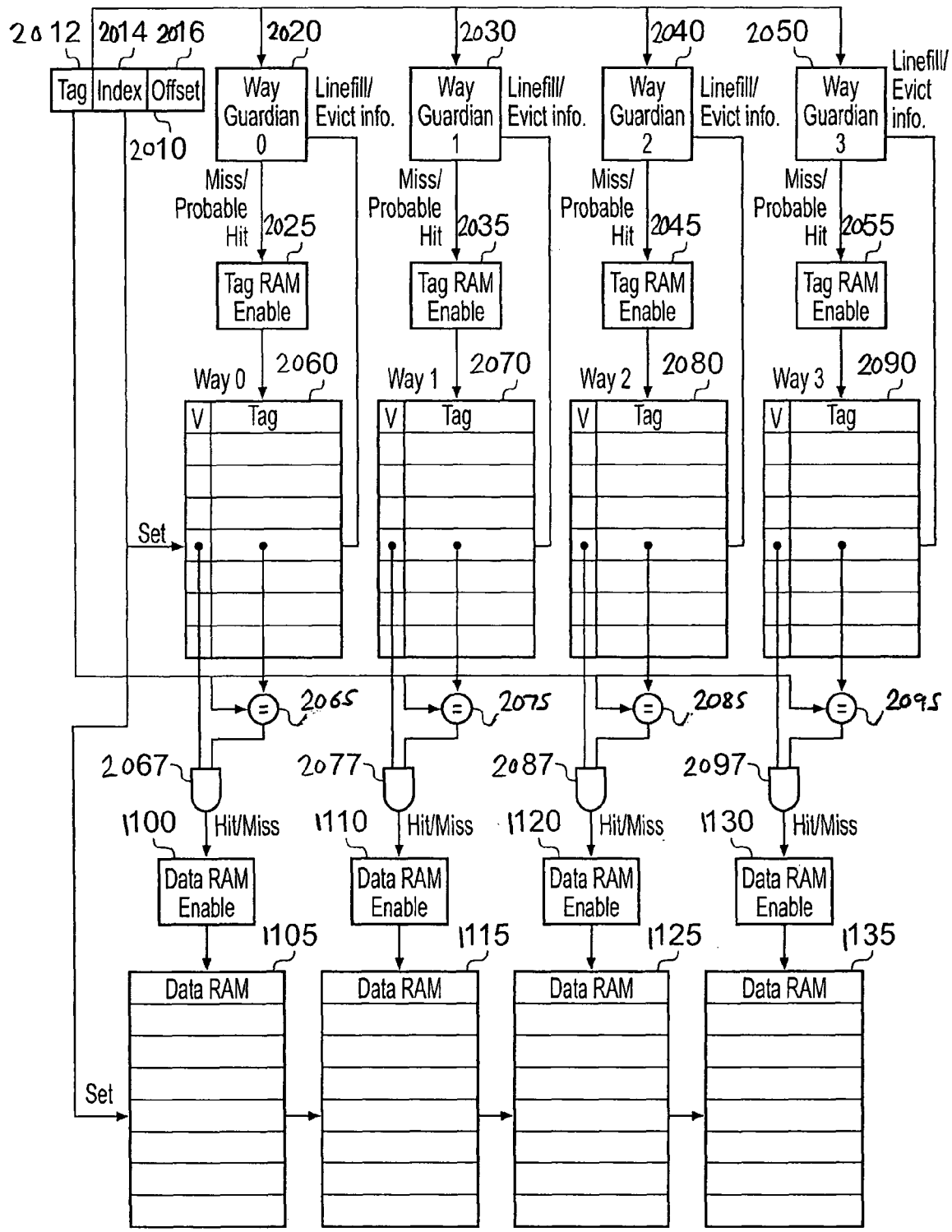
FIG. 13 is a block diagram of a cache and associated indication logic in accordance with one example embodiment.

FIG. 13 is a diagram illustrating a cache and associated indication logic in accordance with one embodiment. In this embodiment, a four way set associative cache is shown, each way having a tag array 2060, 2070, 2080, 2090 and an associated data array 1105, 1115, 1125, 1135, respectively. Each data array consists of a plurality of cache lines, with each cache line being able to store a plurality of data values. For each cache line in a particular data array, the corresponding tag array will have an associated entry storing a tag value that is associated with each data value in the corresponding cache line, and a valid field indicating whether the corresponding cache line is valid. As will be appreciated by those skilled in the art, certain other fields may also be provided within the tag array, for example to identify whether the corresponding cache line is clean or dirty (a dirty cache line being one whose contents are more up-to-date than the corresponding data values as stored in memory, and hence which when evicted from the cache will require an update procedure to be invoked to write the values back to memory, assuming the cache line is still valid at that time).

The address 2010 associated with a memory access request can be considered to comprise a tag portion 2012, an index portion 2014 and an offset portion 2016. The index portion 2014 identifies a particular set within the set associative cache, a set comprising of a cache line in each of the ways. Accordingly, for the four way set associative cache shown in FIG. 12, each set has four cache lines.

A lookup procedure performed by the cache on receipt of such an address 2010 will typically involve the index 2014 being used to identify an entry in each tag array 2060, 2070, 2080, 2090 associated with the relevant set, with the tag data in that entry being output to associated comparator logic 2065, 2075, 2085, 2095, which compares that tag value with the tag portion 2012 of the address 2010. The output from each comparator 2065, 2075, 2085, 2095 is then routed to associated AND logic 2067, 2077, 2087, 2097, which also receive as their other input the valid bit from the relevant entry in the associated tag array. Assuming the relevant entry indicates a valid cache line, and the comparator detects a match between the tag portion 2012 and the tag value stored in that entry of the tag array, then a hit signal (in this embodiment a logic one value) will be output from the relevant AND logic to associated data RAM enable circuitry 1100, 1110, 1120, 1130. If any hit signal is generated, then the associated data RAM enable logic will enable the associated data array, 1105, 1115, 1125, 1135, as a result of which a lookup will be performed in the data array using the index 2014 to access the relevant set, and the offset 2016 to access the relevant data value within the cache line.

It will be appreciated that for the lookup procedure described above, this would involve accessing all of the tag arrays, followed by an access to any data array for which a hit signal was generated. As discussed earlier, a cache arranged to perform the lookup procedure in this manner is referred to as a serial access cache. In accordance with embodiments of the present invention, a power saving is achieved in such caches by providing indication logic which in the embodiment of FIG. 13 comprises a series of way guardian logic units 2020, 2030, 2040, 2050, one way guardian logic unit being associated with each way of the cache. The construction of the way guardian logic will be described in more detail later, but its basic operation is as follows. Within the way guardian logic unit, guarding data is stored, which is updated based on linefill and eviction information pertaining to the associated way. Then, each time an access request is issued, the tag portion 2012 and index portion 2014 of the address 2010 are routed to each of the way guardian logic units 2020, 2030, 2040, 2050, on receipt of which a hash operation is performed in order to generate one or more index values used to reference the guarding data. This results in the generation of an indication which is output from each way guardian logic unit 2020, 2030, 2040, 2050, to associated tag RAM enable circuits 2025, 2035, 2045, 2055.

Due to the nature of the guarding data retained by the way guardian logic units 2020, 2030, 2040, 2050, each indication generated indicates whether the data value the subject of the access request is either definitely not stored in the associated segment or is potentially stored within the associated segment. Hence, as indicated in FIG. 13, the output from each way guardian logic unit 2020, 2030, 2040, 2050 will take the form of a miss signal or a probable hit signal. In the event of a miss signal, the associated tag RAM enable circuitry will cause the associated tag array to be disabled, such that the lookup procedure is only performed in respect of those tag arrays for which the associated way guardian logic unit has produced a probable hit signal, thereby causing the associated tag RAM enable circuitry to be enabled.

The power savings achievable by such an approach are clear, since instead of having to perform a tag lookup in each tag array, the tag lookup only needs to be performed in a subset of the tag arrays whose associated way guardian logic units have identified a probable hit. A particular example is illustrated in FIG. 14.

Figure 14:
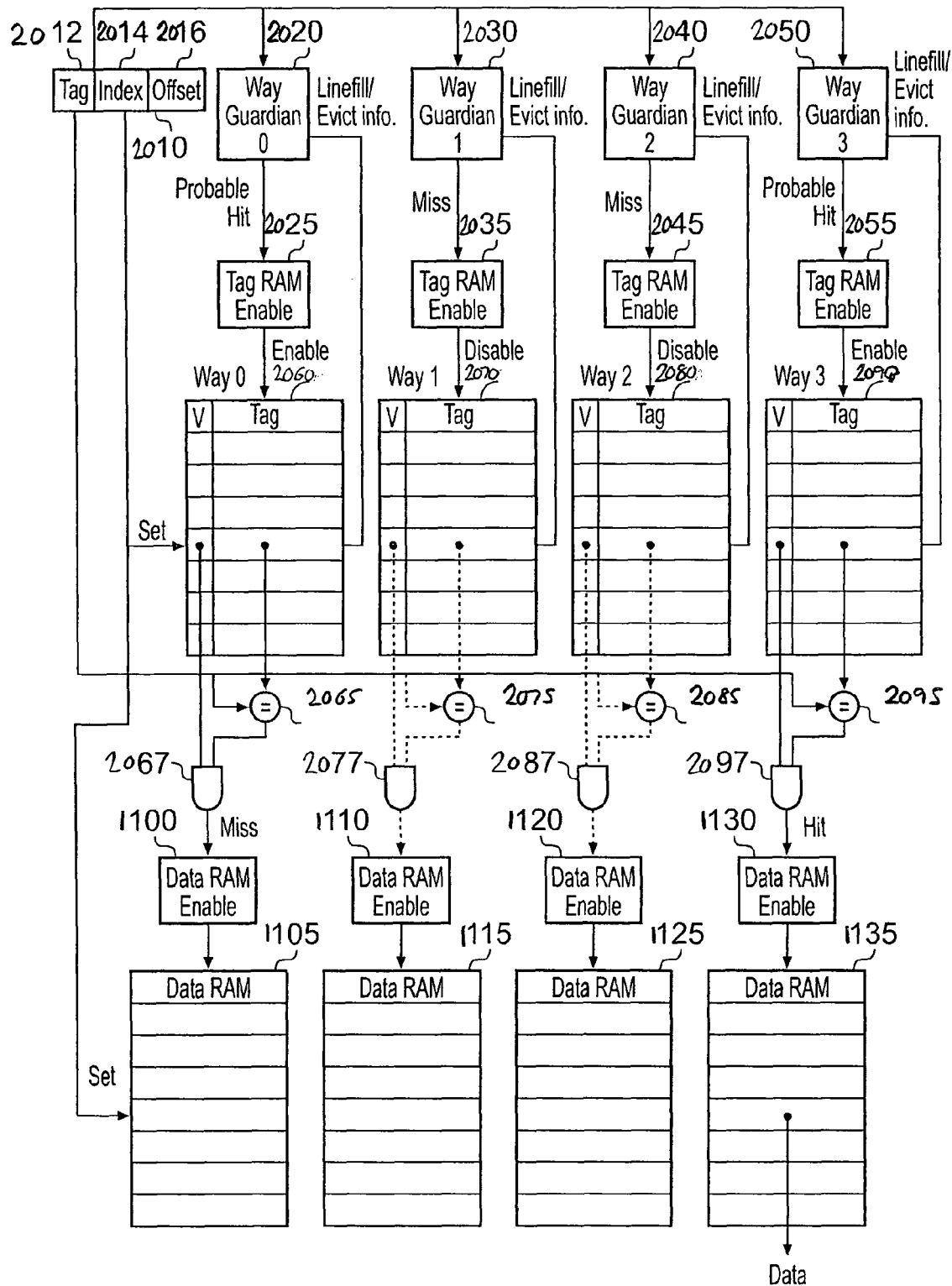
FIG. 14 illustrates an example of a cache lookup operation using the logic of FIG. 13.

The circuitry of FIG. 14 is identical to that of FIG. 13, but in FIG. 14 a particular example is illustrated where the way guardian logic units 2020, 2050 identify a probable hit, but the way guardian logic units 2030, 2040 identify a definite miss. In this example, the tag RAM enable circuits 2035, 2045 disable the associated tag arrays 2070, 2080, which not only avoids any power consumption being used in accessing those tag arrays, but also avoids any power consumption being used in operating the comparison logic 2075, 2085 and the associated logic 2077, 2087. A default logic zero value is in this instance output by the logic 2077, 2087, which causes the data RAM enable circuits 1110 and 1120 to disable the associated data arrays 1115 and 1125.

The probable hit signals generated by the way guardian logic units 2020, 2050 cause the associated tag RAM enable circuitry 2025, 2055 to enable the associated tag arrays 2060, 2090, and hence the earlier described lookup procedure is performed in respect of those two tag arrays. As can be seen from FIG. 14, in this example a miss is detected by the logic 2067 in association with the tag array 2060, whilst a hit is detected by the logic 2097 in association with the tag array 2090. Thus, the data RAM enable circuit 1100 is disabled and the data RAM enable circuit 1130 is enabled, as a result of which a single data array lookup is performed in the data array 1135 in order to access a data value identified by the index 2014 and offset 2016 in the address 2010. In this particular example, the cache lookup procedure involves two tag array lookups and one data array lookup, whereas without the use of this embodiment of the present invention the lookup procedure would have involved four tag array lookups and one data array lookup.

Each indication unit within the indication logic 1820, 1840, 1860 of FIG. 12, which in the example of FIG. 13 are shown as way guardian logic units 2020, 2030, 2040, 2050, can be implemented in a variety of ways. However, the main purpose of each indication unit is to produce an indication of whether a data value is either definitely not stored in the associated cache segment or may be stored in the associated cache segment, i.e. an indication of a cache segment miss is a safe indication, rather than merely a prediction. In one particular embodiment, each indication unit uses a Bloom filter technique to produce such an indication.

Bloom Filters were named after Burton Bloom for his seminal paper entitled "Space/time trade-offs in hash coding with allowable errors", Communications of the ACM, Volume 13, Issue 4, July 1970. The purpose was to build memory efficient database applications. Bloom filters have found numerous uses in networking and database applications in the following articles:

A. Border and M. Mitzenmacher, "Network application of Bloom Filters: A Survey", in 40th Annual Allerton Conference on Communication, Control, and Computing, 2002;

S. Rhea and J. Kubiatowicz, "Probabilistic Location and Routing", IEEE INFOCOM'02, June 2002;

S. Dharmapurikar, P. Krishnamurthy, T. Sproull and J. Lockwood, "Deep Packet Inspection using Parallel Bloom Filters", IEEE Hot Interconnects 12, Stanford, Calif., August 2003;

A. Kumar, J. Xu, J. Wang, O. Spatschek, L. Li, "Space-Code Bloom Filter for Efficient Per-Flow Traffic Measurement", Proc. IEEE INFOCOM, 2004;

F. Chang, W. Feng and K. Li, "Approximate Caches for Packet Classification", IEEE INFOCOM'04, March 2004;

S. Cohen and Y. Matias, "Spectral Bloom Filters", Proceedings of the 2003 ACM SIGMOD International Conference on Management of Data, 2003; and L. Fan, P. Cao, J. Almeida, and A. Broder, "Summary cache: A scalable wide-area Web cache sharing protocol," IEEE/ACM Transactions on Networking, vol. 8, no. 3, pp. 281-293, 2000.

For a generic Bloom filter, a given address portion in N bits is hashed into k hash values using k different random hash functions. The output of each hash function is an m-bit index value that addresses a Bloom filter bit vector of $2^m$. Here, m is typically much smaller than N. Each element of the Bloom filter bit vector contains only 1 bit that can be set. Initially, the Bloom filter bit vector is zero. Whenever an N-bit address is observed, it is hashed to the bit vector and the bit value hashed by each m-bit index is set.

When a query is to be made whether a given N-bit address has been observed before, the N-bit address is hashed using the same hash functions and the bit values are read from the locations indexed by the m-bit hash values. If at least one of the bit values is 0, this means that this address has definitely not been observed before. If all of the bit values are 1, then the address may have been observed but this cannot be guaranteed. The latter case is also referred to herein as a false hit if it turns out in fact that the address has not been observed.

As the number of hash functions increases, the Bloom filter bit vector is polluted much faster. On the other hand, the probability of finding a zero during a query increases if more hash functions are used.

Recently, Bloom filters have been used in the field of computer micro-architecture. Sethumadhvan et al in the article "Scalable Hardware Memory Disambiguation for High ILP Processors", Proceedings of the 36th International Symposium for Microarchitecture pp. 399-410, 2003, uses Bloom Filters for memory disambiguation to improve the scalability for load store queues. Roth in the article "Store Vulnerability Window (SVW): Re-Execution Filtering for Enhanced Load Optimization", Proceedings of the 32$^{nd}$ International Symposium on Computer Architecture (ISCA-05), June 2005, uses a Bloom filter to reduce the number of load re-executions for load/store queue optimizations. Akkary et al in the article "Checkpoint Processing and Recovery: Towards Scalable Large Instruction Window Processors", Proceedings of the 36th International Symposium for Microarchitecture, December, 2003, also uses a Bloom filter to detect the load-store conflicts in the store queue. Moshovos et al in the article "JETTY: Snoop filtering for reduced power in SMP servers", Proceedings of International Symposium on High Performance Computer Architecture (HPCA-7), January 2001, uses a Bloom filter to filter out cache coherence requests or snoops in SMP systems.

In the embodiments described herein the Bloom filter technique is employed for the purpose of detecting cache misses in individual segments of a cache. In one particular embodiment, a counting Bloom filter technique is used. The counting Bloom Filter has one counter corresponding to each bit in the bit vector of a normal Bloom Filter. The counting Bloom Filter can be arranged to track addresses entering and leaving an associated cache segment. Whenever there is a line fill in the cache segment, the counters corresponding to the hashes for the address are incremented. In the case of a cache replacement in that segment, the corresponding counters are decremented. If the counter is zero, the address has never been seen before. If the counter is greater than one, the address may have been encountered.

Figure 15:
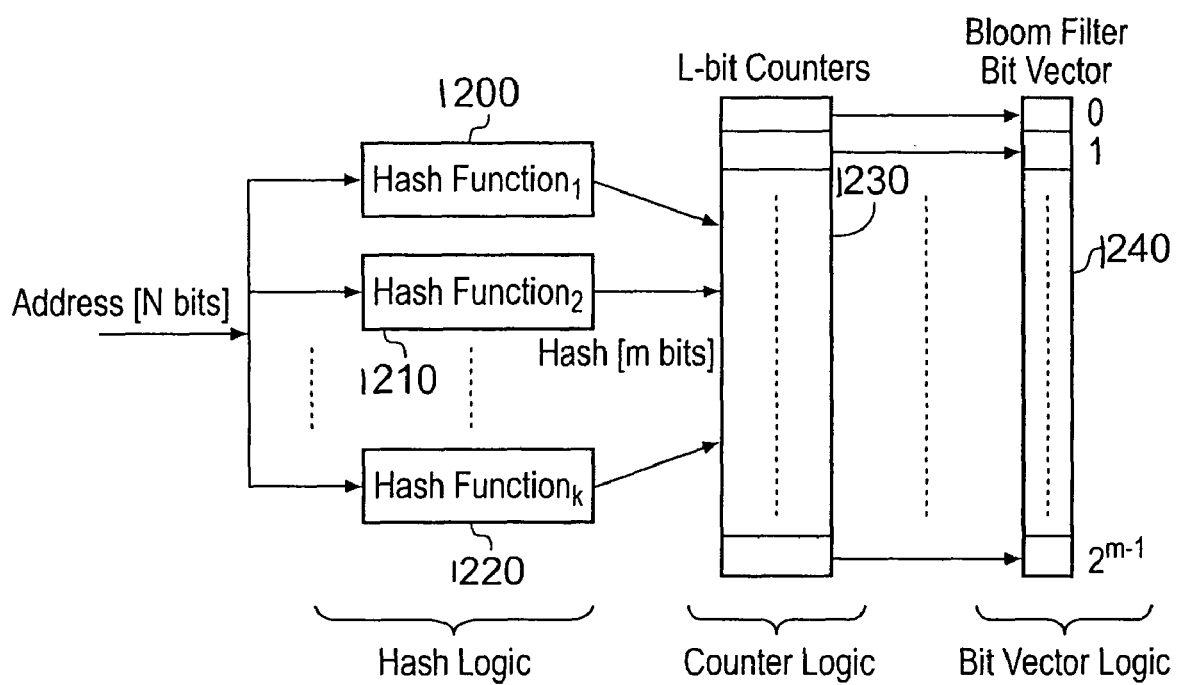
FIG. 15 is a block diagram of the indication logic in accordance with one example embodiment.

In one particular embodiment, a segmented counting Bloom filter design is used. In accordance with this novel segmented approach, the indication logic has counter logic and separate vector logic as illustrated schematically in FIG. 15. The counter logic 1230 has a plurality of counter entries, with each counter entry containing a count value, and the vector logic 1240 has a vector entry for each counter entry in the counter logic 1230, each vector entry containing a value (preferably a single bit) which is set when the count value in the corresponding counter entry changes from a zero value to a non-zero value, and which is cleared when the count value in the corresponding counter entry changes from a non-zero value to a zero value. Each counter is in one embodiment non-saturating to prevent overflows.

Whenever a data value is stored in, or removed from, the associated cache segment, a portion of the associated address is provided to the hash functions 1200, 1210, 1220, of the hash logic, each of which generates an m-bit index identifying a particular counter in the counter logic 1230. The counter value in each identified counter is then incremented if a data value is being stored in the cache segment, or is decremented if a data value is being removed from the cache segment. If more than one hash index identifies the same counter for a given address, the counter is incremented or decremented only once. For certain access requests, the indication logic can then be accessed by issuing the relevant address portion to the hash functions 1200, 1210, 1220 to cause corresponding indexes to be generated identifying particular vector entries in the vector logic 1240. If the value in each such vector entry is not set, then this indicates that the data value is not present in the cache, and accordingly a cache segment miss indication can be generated indicating that the data value is not stored in the cache segment. If in contrast any of the vector entries identified by the indexes are set, then the data value may or may not be in the cache segment.

Figure 16:
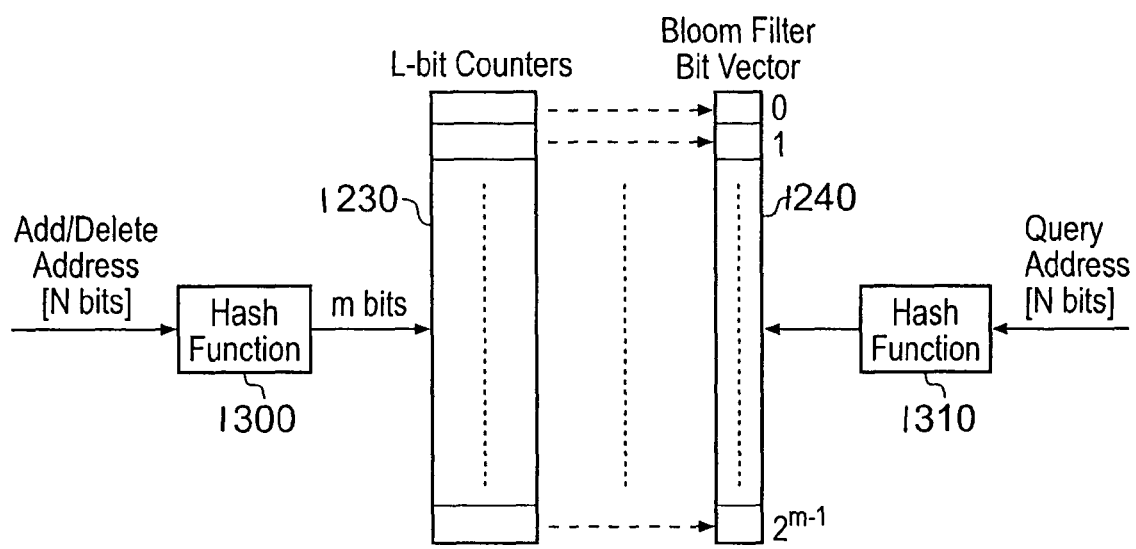
FIG. 16 is a block diagram of the indication logic in accordance with an alternative example embodiment.

FIG. 16 illustrates an alternative embodiment where separate hash logic is provided for the counter logic 1230 and the vector logic 1240. Hence, in this embodiment, the hash logic associated with the counter logic 1230, in this embodiment the hash logic comprising a single hash function 1300, is referenced whenever a data value is stored in, or removed from, the associated cache segment, in order to generate an m-bit index identifying a particular counter in the counter logic 1230. Similarly, for certain access requests, where a lookup is required in the cache, the relevant address portion can be routed to the hash logic associated with the bit vector logic 1240, in this case the hash logic again comprising a single hash function 1310, in order to cause an index to be generated identifying a particular vector entry in the vector logic 1240. Typically, the hash functions 1300 and 1310 are identical.

As illustrated earlier with reference to FIG. 15, multiple hash functions could also be provided in embodiments such as those illustrated in FIG. 16, where separate hash logic is provided for both the counter logic 1230 and the vector logic 1240, so as to cause multiple counter entries or multiple vector entries to be accessed dependent on each address. However, in one embodiment, only a single hash function is used to form the hash logic used to generate the index into either the counter logic or the vector logic, but as shown in FIG. 16 this hash logic is replicated separately for the counter logic and the vector logic, thereby facilitating placement of the vector logic 1240 in a part of the apparatus separate to the counter logic 1230.

It has been found that having one hash function produces false hit rates similar to the rates achieved when having more than one hash function. The number of bits "L" provided for each counter in the counter logic depends on the hash functions chosen. In the worst case, if all cache lines map to the same counter, the bit-width of the counter must be at most $\log_2$ (# of cache lines in one way of the cache). One form of hash function that can be used in one embodiment involves bitwise XORing of adjacent bits. A schematic of this hash function which converts a 32 bit address to a m bit hash is shown in FIG. 17.

Figure 17:
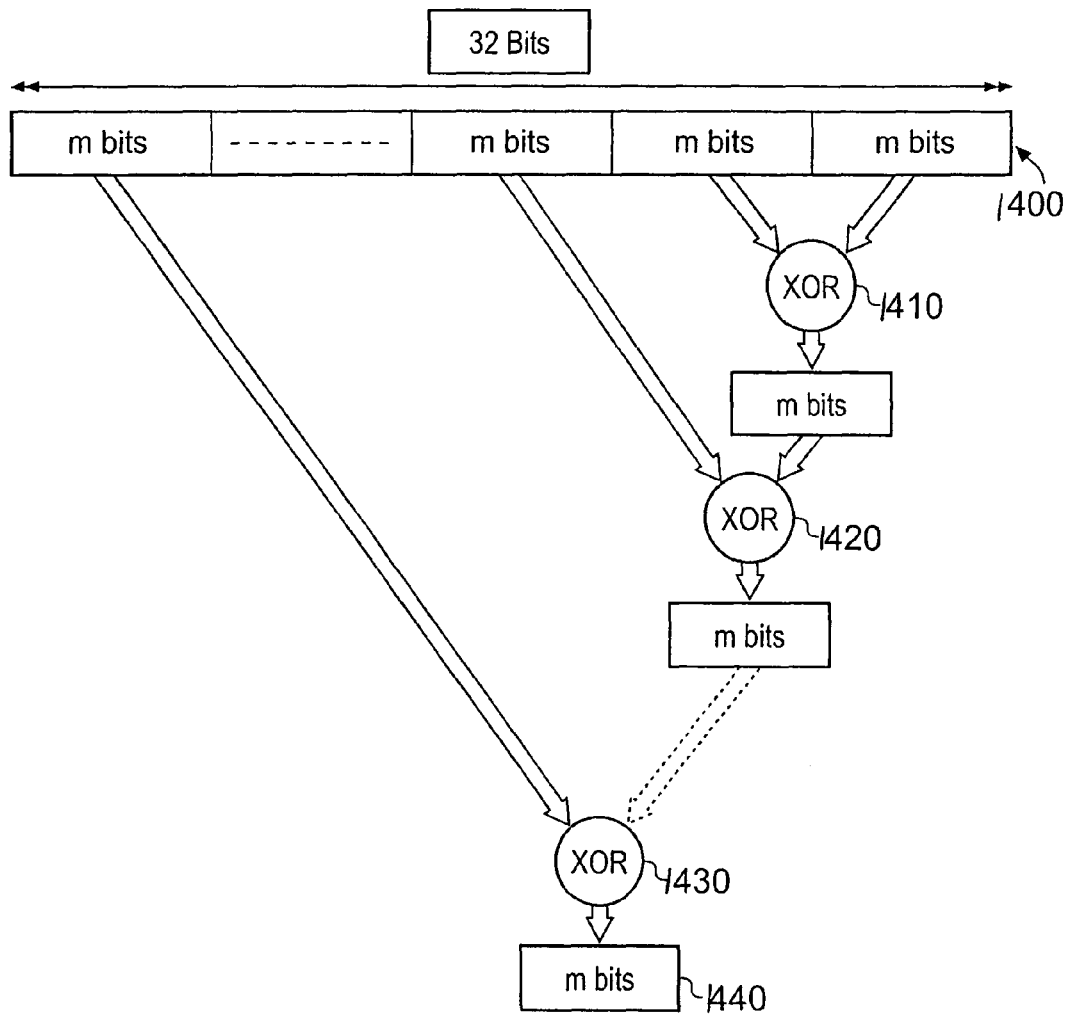
FIG. 17 is a diagram schematically illustrating the operation of the hash function illustrated in FIG. 16 in accordance with one embodiment.

As shown in FIG. 17, each pair of m bits in the address is passed through an XOR function 1410, 1420, 1430 so as to ultimately reduce the address 1400 to a single m-bit index 1440.

Another simplistic hash function that may be chosen uses the lower $\log_2$ (N) bits of the block address (N is the size of the bloom filter). It can be proven with this hash function that the number of bits per counter is equal to 1 (if N>the number of cache sets). Other simple hash functions could be chosen, such as Hash=Addr % Prime, where Prime is the greatest prime number less than N.

As mentioned earlier, the segmented design provides separate counter logic 1230 and bit vector logic 1240. There are several benefits realised by such a segmented design. Firstly, to know the outcome of a query to the Bloom filter, only the bit vector logic 1240 needs to be accessed, and its size is smaller than the counter logic 1230. Keeping the bit vectors separate hence enables faster and lower power accesses to the Bloom Filter. In addition, updates to the counter logic 1230 are much more frequent than updates to the bit vector logic 1240. Thus segmenting the counter logic and the bit vector logic allows the counter logic to be run at a much lower frequency than the bit vector logic, which is acceptable since the operation of the counter logic is not time critical. In particular, the bit vector logic only needs updating if a particular counter entry in the counter logic changes from a non-zero value to a zero value, or from a zero value to a non-zero value.

Hence, the use of such a segmented design to form each indication unit of the indication logic 1820, 1840, 1860 leads to a particularly efficient approach for generating a segment cache miss indication used to improve power consumption when accessing the cache.

Figure 18:
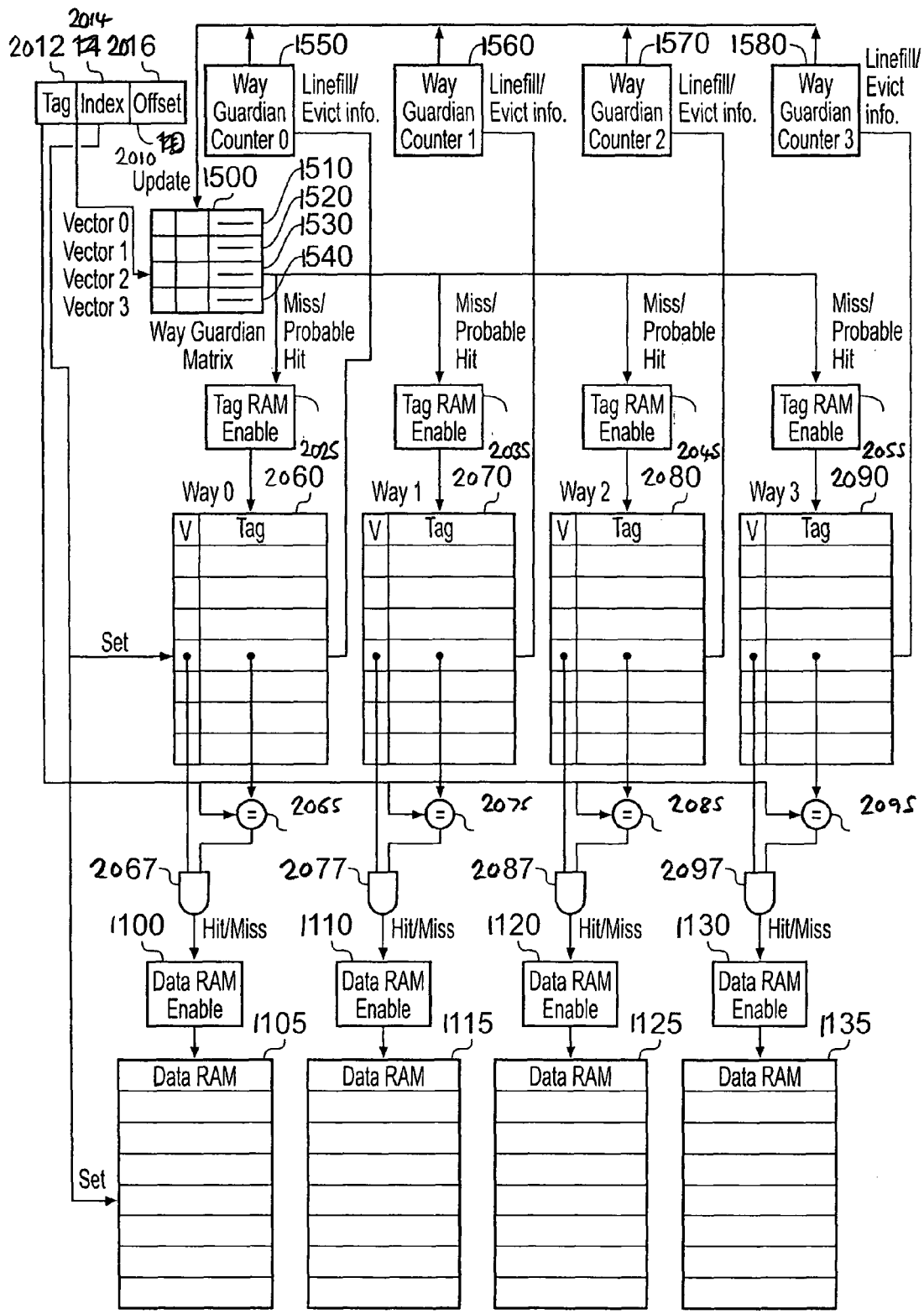
FIG. 18 is a block diagram of a cache and associated indication logic in accordance with an alternative example embodiment.

FIG. 18 illustrates an alternative embodiment of a cache and associated indication logic which can be used instead of the arrangement of FIG. 13. As explained earlier, each way guardian logic unit can be implemented by a segmented Bloom filter approach consisting of separate counter logic and bit vector logic. Each way guardian logic unit 2020, 2030, 2040, 2050 would use the same hash function(s) to generate the required index or indexes from each address. Thus, given a particular data address 2010, all of the way guardian logic units 2020, 2030, 2040, 2050 would check at the same index or indexes. Since in one embodiment all of the way guardian logic units are accessed for each address 2010, FIG. 18 illustrates an alternative variant, where the vector logic part of each segmented Bloom filter are located together within a matrix storage 1500. Hence, as shown in FIG. 18, the matrix 1500 will store vector logic 1510 associated with way zero, vector logic 1520 associated with way one, vector logic 1530 associated with way two, and vector logic 1540 associated with way three. Separate way guardian counter logic 1550, 1560, 1570, 1580 is then maintained in association with each way, with the counters in each counter logic being updated based on the linefill and eviction information from the associated way of the cache. Whenever a particular counter changes from a non-zero value to a zero value or from a zero value to a non-zero value, the corresponding update is made to the relevant bit vector in the matrix 1500.

For each address 2010, the tag portion 2012 and index portion 2014 are routed to the way guardian matrix 1500 where the hash logic generates one or more indexes (as described earlier in one embodiment only a single hash function will be used and hence only a single index will be generated), which will then be used to access the matrix 1500 in order to output for each way a miss or probable hit indication based on the value of the vector entry or vector entries accessed in each bit vector 1510, 1520, 1530, 1540 of the matrix 1500. From this point on, the operation of the circuit shown in FIG. 18 is as described earlier with reference to FIG. 13.

Figure 19:
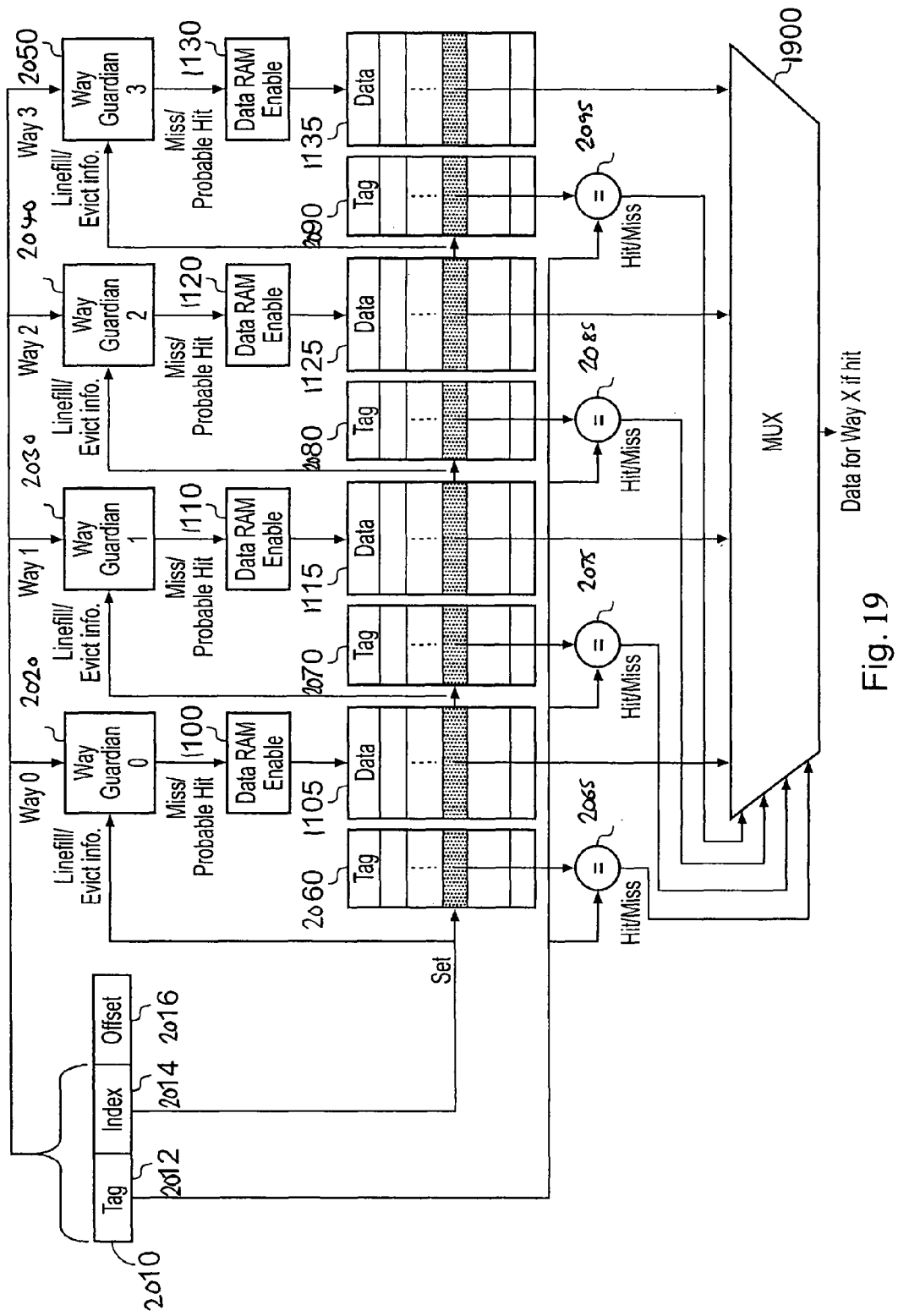
FIG. 19 is a block diagram of a cache and associated indication logic in accordance with an alternative example embodiment.

FIG. 19 is a diagram illustrating a cache and associated indication logic in accordance with an alternative embodiment. This embodiment is similar to that described earlier with reference to FIG. 13, in that the cache is arranged as a four way set associative cache having one way guardian logic unit associated with each way of the cache. For ease of comparison with FIG. 13, like elements have been identified in both FIGS. 2 and 8 using the same reference numerals. However, in contrast to the embodiment of FIG. 13, the cache illustrated in FIG. 19 is a parallel access cache, where during a lookup procedure the tag arrays and data arrays are accessed at the same time.

As shown in FIG. 19, the index portion 2014 of an address 2010 is used to identify an entry in each tag array 2060, 2070, 2080, 2090 associated with the relevant set, with the tag data in that entry being output to associated comparator logic 2065, 2075, 2085, 2095. At the same time, the tag portion 2012 and index portion 2014 of the address are routed to each of the way guardian logic units 2020, 2030, 2040, 2050 to initiate a lookup in those units in the manner discussed earlier with reference to FIG. 13. This results in the generation of an indication which is output from each way guardian logic unit 2020, 2030, 2040, 2050 to associated data RAM enable circuits 1100, 1110, 1120, 1130. Depending on the timing of the logic it may not be necessary to provide separate data RAM enable circuits as shown, and instead the indications from the way guardian logic units 2020, 2030, 2040, 2050 could directly enable or disable the respective data arrays 1105, 1115, 1125, 1135.

For any data arrays where the indication identifies a definite miss, those data arrays are disabled and no lookup is performed. However, for any data arrays where the indication identifies a probable hit, a lookup is performed in those data arrays using the index 2014 to access the relevant set and the offset 2016 to access the relevant data value within the cache line. These accessed data values are then output to the multiplexer 1900. Whilst any such data array lookups are being performed, the comparator logic 2065, 2075, 2085, 2095 will be comparing the tag values output from the respective tag arrays 2060, 2070, 2080, 2090 with the tag portion 2012 of the address, and in the event of a match will issue a hit signal to the multiplexer 1900.

If one of the comparators 2065, 2075, 2085, 2095 generates a hit signal, that is used to cause the multiplexer 1900 to output the data value received from the corresponding data array 1105, 1115, 1125, 1135. From the above description, it will be seen that in such an embodiment the indications produced by the way guardian logic units can be used to disable any data arrays for which the associated way guardian logic unit determines that the data value is definitely not stored therein, thereby saving cache energy that would otherwise be consumed in accessing those data arrays. Further, in the manner described with reference to FIG. 19, the operation of the way guardian logic units is arranged to have no penalty on cache access time.

Figure 20:
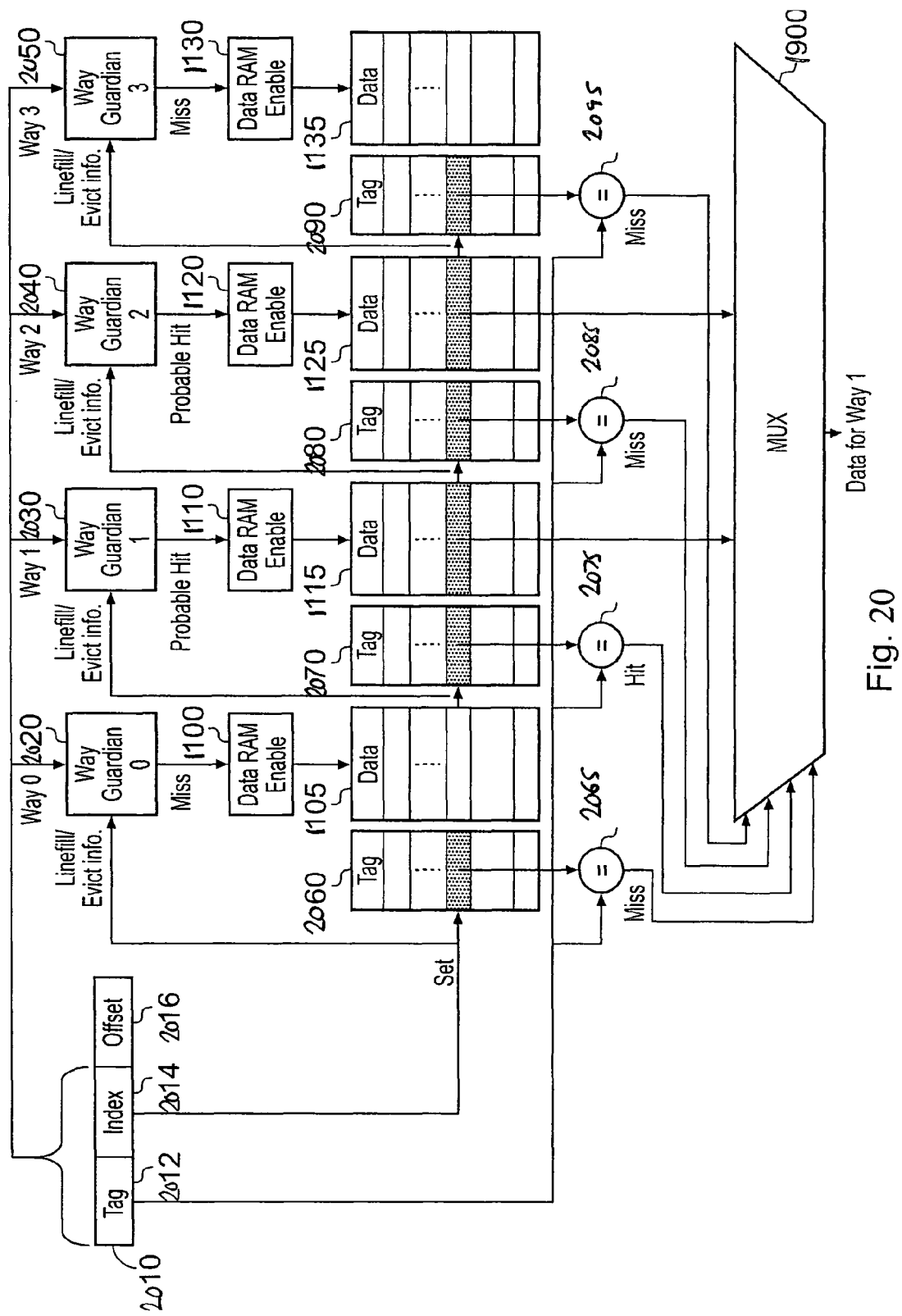
FIG. 20 illustrates an example of a cache lookup operation using the logic of FIG. 19.

A particular example of the operation of the logic of FIG. 19 is shown in FIG. 20. In this example, the way guardian logic units 2030, 2040 identify a probable hit, but the way guardian logic units 2020, 2050 identify a definite miss. As a result, lookups are performed in data arrays 1115, 1125, but data arrays 1105, 1135 are disabled. Meanwhile each of the comparators 2065, 2075, 2085, 2095 will perform their comparison of the tag values output from the respective tag arrays 2060, 2070, 2080, 2090 with the tag portion 2012 of the address, and as shown in FIG. 20 this results in comparator 2075 detecting a match and generating a hit signal. All other comparators do not detect a match. As a result, multiplexer 1900 outputs the data value obtained from data array 1115, i.e. the data value found in way 1.

Figure 21:
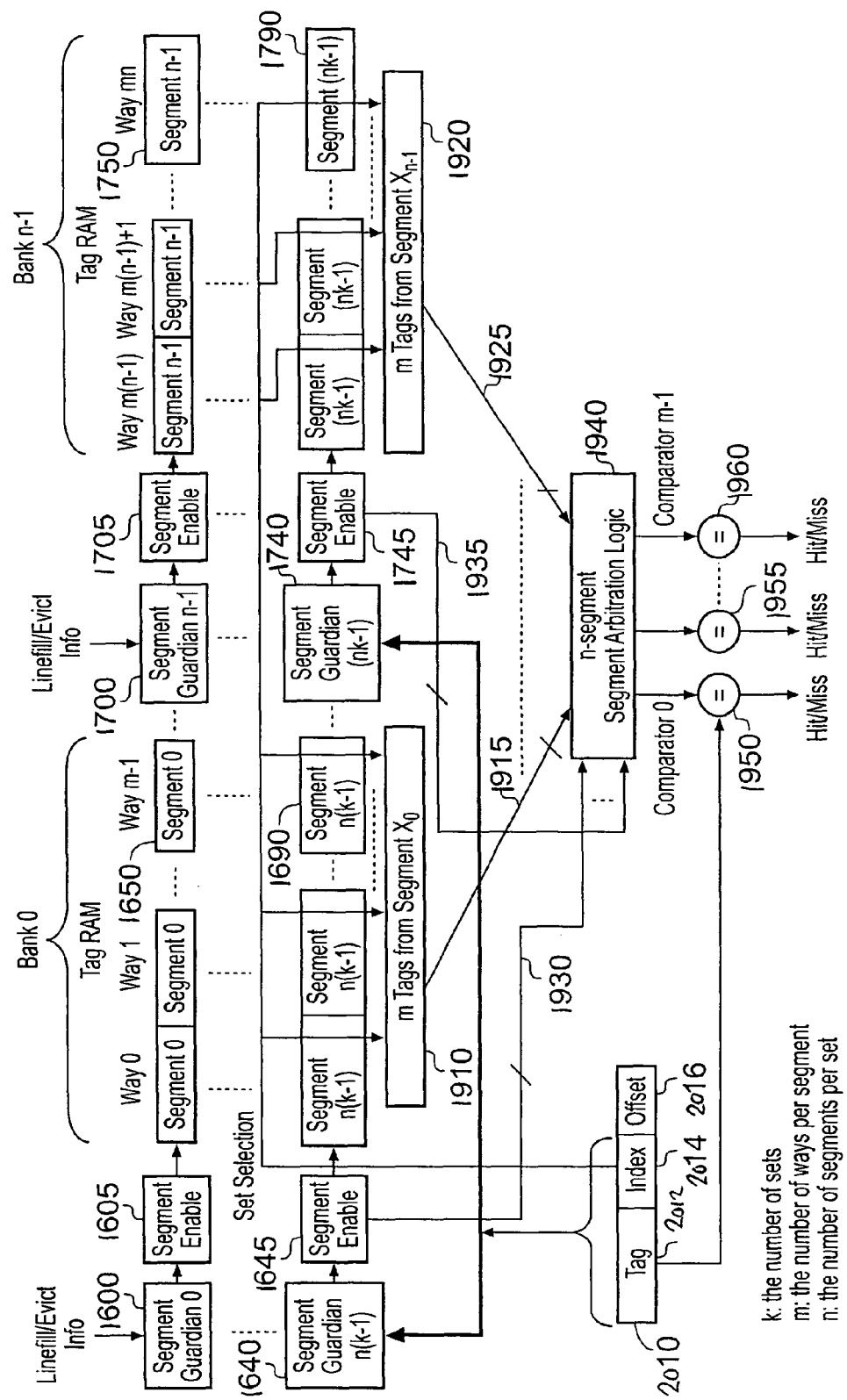
FIG. 21 is a block diagram illustrating the indication logic and the tag RAM portion of a cache in accordance with an alternative example embodiment.

FIG. 21 illustrates an alternative embodiment, where instead of providing indication units in association with each way of the cache, indication units are instead provided in association with at least part of each set of the cache. In particular, in this example, each set in the cache is logically partitioned into n segments. Hence, segment zero 1650 comprises the tag array entries for set zero in ways zero to m−1, and segment n−1 1750 comprises the tag array entries for set zero in ways m(n−1) to mn. Likewise segment n(k−1) 1690 and segment nk−1 1790 contain the tag array entries of the various ways for set k−1. Each segment has associated therewith segment guardian logic 1600, 1640, 1700, 1740, which is used to drive associated segment enable circuitry 1605, 1645, 1705, 1745, respectively. As with the way guardian logic unit described in FIG. 13, each segment guardian logic unit maintains guarding data (which in one embodiment is comprised of the counter logic and vector logic discussed earlier) which is maintained based on linefill and eviction information pertaining to the associated segment. Further, for each address 2010, the tag portion 2012 and index portion 2014 are used to reference the segment guardian logic units associated with the relevant set so as to generate an indication which identifies a miss or a probable hit in the associated segment, with this indication being used to either enable or disable the associated segment enable circuitry. The index portion 2014 is also routed to the tag array to select the relevant set. Each segment in that associated set, provided its associated segment enable circuitry is enabled, will then output m tag values 1910, 1920, which will be routed over paths 1915, 1925 to the segment arbitration logic 1940.

The segment arbitration logic 1940 also receives over path 1930, 1935 the segment enable values associated with the relevant segment enable circuitry which, in the event that the segment arbitration logic 1940 receives tags from multiple segments, can be used to prioritise one of those segments. The prioritisation may be performed on a sequential or random basis. Alternatively, in one embodiment, prediction logic is used in addition to the indication logic to predict a segment in which the data value may exist, and this is used by the segment arbitration logic to arbitrate a particular segment ahead of another segment. In particular, if one of the segments producing tags input to the segment arbitration logic 1940 corresponds with the segment identified by the prediction logic, then the segment arbitration logic 1940 is arranged to select that segment.

For the selected segment, the m tags are then output to m comparators 1950, 1955, 1960, which are arranged to compare the tags with the tag portion 2012 of the address, resulting in the generation of hit or miss signals from each comparator 1950, 1955, 1960. If a hit is generated by one of the comparators, then this is used to enable the associated data array and cause the relevant data value to be accessed. In the event that all of the comparators produce a miss, then the segment arbitration logic 1940 is arranged to re-arbitrate in order to choose another segment that has produced m tags, such that those tags are then routed to the comparators 1950, 1955, 1960. This process is repeated until a cache hit is detected, or all of the multiple segments producing tags have been subjected to the lookup procedure. Depending on the number of segments enabled as a result of the segment guardian lookup, it will be appreciated that the maximum number of segments to be arbitrated between would be "n", but in practice there will typically be significantly less than n segments due to the segment guardian lookups identifying definite misses in some segments.

By such an approach, the comparator logic 1950, 1955, 1960 can be shared across multiple segments, with the segment arbitration logic 1940 selecting separate segments in turn for routing to the comparator logic 1950, 1955, 1960. This hence decreases the cost associated with the comparison logic, albeit at the expense of an increased access time due to the serial nature of the comparison. However, this performance impact may in practice be relatively low, since in many instances there may only be a few segments that are enabled based on the output from the various segment guardian logic units for the relevant set, and accordingly only a few groups of m tags needs to be subjected to comparison by the comparison logic 1950, 1955, 1960.

Figure 22:
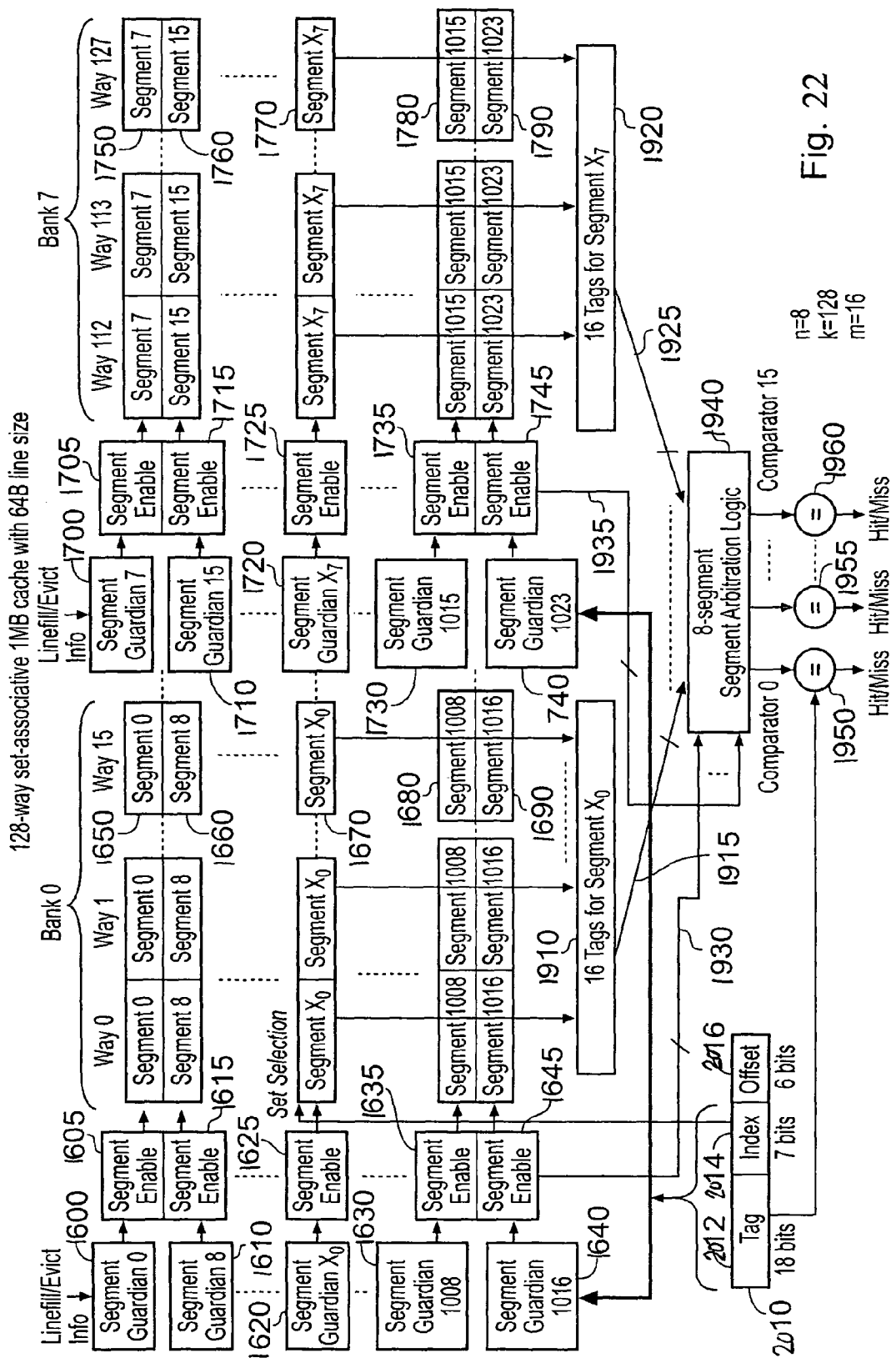
FIG. 22 illustrates an example of a cache lookup operation using the logic of FIG. 21.

The embodiment of FIG. 21 may be particularly useful in very highly set-associative caches where there are a large number of ways, and accordingly a large number of cache lines in each set. In such instances, significant power savings can be adopted by use of the approach illustrated in FIG. 21. In particular, it has been found that such an approach can offer very high associativity at the dynamic energy costs of much lower set associative caches. For example, a sample associative cache as shown in FIG. 21 may provide the functionality of a 128 way set associative cache with an energy profile and timing characteristics close to a 16 way set associative cache. Such an example is illustrated in FIG. 22, where a 128 way set associative cache has a size of 1 Mb with cache lines of 64 bytes. As can be seen from FIG. 22, n=8 (i.e. there are 8 segments per set), k=128 (i.e. there are 128 sets) and m=16 (i.e. there are 16 ways per segment). As shown in FIG. 22, each of the segments 1650, 1660, 1670, 1680, 1690, 1750, 1760, 1770, 1780, 1790 have associated segment guardian logic 1600, 1610, 1620, 1630, 1640, 1700, 1710, 1720, 1730, 1740 used to enable or disable associated segment enable circuitry 1605, 1615, 1625, 1635, 1645, 1705, 1715, 1725, 1735, 1745, respectively.

In the example given, the index portion 2014 of the address identifies the set consisting of segments $X_0$ to $X_7$. For each of the at most eight segments that are enabled by their associated segment enable circuitry 1625, 1725, sixteen tag values are output, one for each way in that segment. If more than one segment produces a set of sixteen tag values, then segment arbitration logic 1940 arbitrates between those multiple segments to choose one set of sixteen tag values to be output to the sixteen comparators 1950, 1955, 1960. If a hit is detected by one of those comparators, then a lookup is performed in the data array for the corresponding way in order to access the required data value. In this instance, only 16 tag comparisons will be necessary assuming a hit is detected in the first segment arbitrated, even though there are 128 ways. Hence, significant power savings are achievable using the above technique. Also, cache access timing characteristics can be achieved which are similar to much lower set associative caches.

Figure 23:
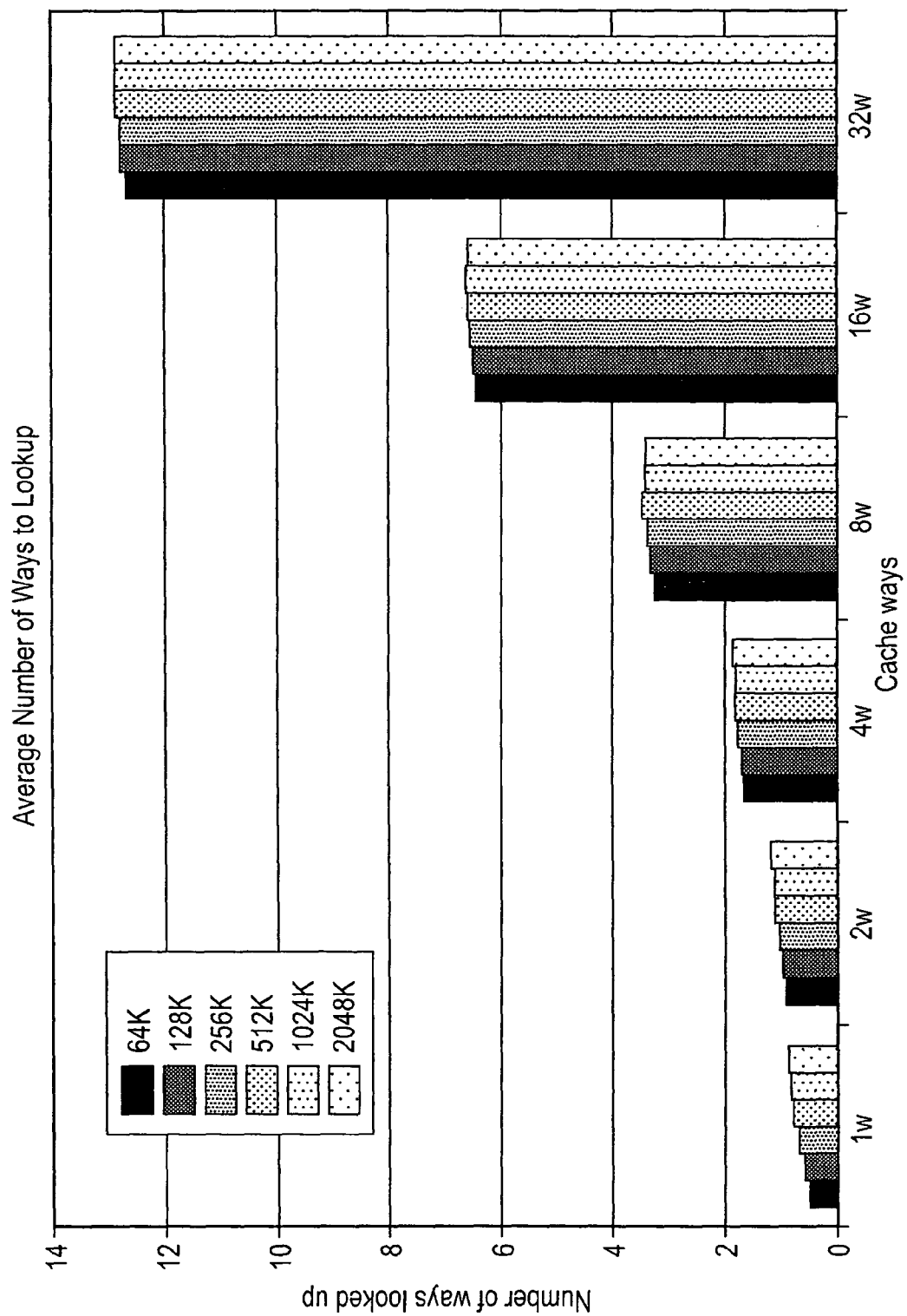
FIG. 23 is a chart illustrating for various types of set associative cache the average number of ways that need to be subjected to a lookup procedure when using the logic of FIG. 13.

FIG. 23 is a chart illustrating some results obtained when analysing the design of FIG. 13 for caches of different associativity. In particular, to study the performance of the way guardian logic units 2020, 2030, 2040 and 2050, 7 SPEC 2000 integer benchmarks were run in relation to a memory hierarchy having a level two cache with sizes of 64 Kbytes, 128 Kbytes, 256 Kbytes, 512 Kbytes, 1 Mbyte and 2 Mbyte. The level one cache size was always considered to be 16 Kbytes for the instruction cache and 16 Kbytes for the data cache. The associativities for the level two cache were varied from a direct mapped cache to a 32 way cache. The number of entries in the counter logic and vector logic of each way guardian logic unit 2020, 2030, 2040 and 2050 was chosen to be four times the number of cache sets. The results are shown in FIG. 23. FIG. 23 illustrates the average number of ways that need to be subjected to the lookup procedure for each cache using the way guardian approach of FIG. 13. As can be observed from FIG. 23, for all cache configurations less than 47% of the cache ways need to be subjected to the lookup procedure.

Whilst not explicitly shown in the figures, it is possible to combine the way guardian approach, or more generally segment guardian approach, of example embodiments, with known prediction schemes. In such embodiments, the indications produced by the various guardian logic units would be used in association with the prediction produced by the prediction logic to determine which segments to subject to the lookup procedure. In particular, the cache may be arranged in the first instance to perform the lookup procedure in respect of any segments identified by both the prediction logic and the segment guardian logic as possibly storing the data value, and in the event of a cache miss in those segments the cache would then be operable to further perform the lookup procedure in respect of any remaining segments identified by the segment guardian logic as possibly storing the data value. Further, if the prediction produced by the prediction logic identified a segment that the segment guardian logic identified as definitely not storing the data value, then the prediction can be ignored to save any power being expended in performing a lookup based on that prediction. By combining the segment guardian approach of example embodiments with known prediction schemes, it has been found that further power savings can be achieved.

It has been found that the techniques described above enable dynamic power savings to be achieved for every cache access. In particular, significant savings in cache dynamic power can be achieved due to the fact that the guardian logic units use a hash operation to access a bit vector, which consumes much less power than the corresponding tag array that the guardian logic unit is guarding. Because such guardian logic can produce miss indications which are definitive, rather than predictions, this can be used to avoid the lookup procedure being initiated in respect of one or more segments, thereby yielding significant power savings. As discussed earlier with reference to FIG. 23, experiments have shown that when using such guardian logic there is a need on average to check less than 47% of the ways for a variety of n way set associative caches where $2 \leq n \leq 32$.

Although particular embodiments have been described herein, it will be apparent that the claims are not limited thereto, and that many modifications and additions may be made within the scope of the claims.

We claim:

1. A data processing apparatus, comprising:
    a plurality of processing units configured to perform data processing operations requiring
 access to data in shared memory, each processing unit when access to data is required issuing an access request specifying an address in memory associated with that data;
    each processing unit having a cache associated therewith configured to store a subset of said data for access by that processing unit, said cache comprising a plurality of data arrays and a corresponding plurality of TAG arrays, each data array including a plurality of cache lines configured to store data values, and the corresponding TAG array having a plurality of TAG entries, where each TAG entry stores a TAG value that is associated with the data values in a corresponding cache line, the cache being arranged as a plurality of segments, where each segment comprises a plurality of said cache lines, each cache being responsive to at least a subset of the access requests issued by its associated processing unit to perform a lookup procedure involving access to at least one TAG array of the cache;
    each cache having indication circuitry associated therewith containing segment filtering data, the indication circuitry being separate from the TAG arrays of the cache and being responsive to an address portion of the address to reference the segment filtering data to provide, for each of at least a subset of the segments, an indication as to whether the data associated with that address is either definitely not stored in that segment or is potentially stored within that segment, the indications produced by the indication circuitry being used by the cache to affect the lookup procedure; and
    cache coherency circuitry employing a cache coherency protocol configured to ensure that said data accessed by each processing unit is up-to-date, the cache coherency circuitry having snoop indication circuitry associated therewith whose content is derived from the segment filtering data of each said indication circuitry, for certain access requests the cache coherency circuitry initiating a coherency operation during which the snoop indication circuitry is referenced to determine whether any of said caches require subjecting to a snoop operation, for each cache for which it is determined a snoop operation should be performed, the cache coherency circuitry being arranged to issue a notification to that cache identifying the snoop operation to be performed;
    wherein each said notification issued by the cache coherency circuitry identifies which segments of the cache are to be subjected to the snoop operation.

2. A data processing apparatus as claimed in claim 1, wherein the snoop indication circuitry maintains a copy of at least part of the segment filtering data of each said indication circuitry.

3. A data processing apparatus as claimed in claim 1, wherein the snoop indication circuitry maintains summary data derived from the segment filtering data of each said indication circuitry.

4. A data processing apparatus as claimed in claim 1, wherein said at least a subset of the segments comprises all segments.

5. A data processing apparatus as claimed in claim 1, wherein at least one cache is a set associative cache, and for that at least one cache each segment comprises at least part of a way of the cache.

6. A data processing apparatus as claimed in claim 5, wherein each segment comprises a way of the cache.

7. A data processing apparatus as claimed in claim 1, wherein at least one cache is a set associative cache, and for that at least one cache each segment comprises at least part of a set of the cache.

8. A data processing apparatus as claimed in claim 1, wherein at least one indication circuitry comprises:
    guardian storage for storing said segment filtering data in the form of guarding data; and
    hash circuitry for performing a hash operation on the address portion in order to reference the guarding data to determine each said indication.

9. A data processing apparatus as claimed in claim 8, wherein for each segment the guardian storage comprises:
    counter circuitry having a plurality of counter entries, each counter entry containing a count value; and
    vector circuitry having a vector entry for each counter entry in the counter circuitry, each vector entry containing a value which is set when the count value in the corresponding counter entry changes from a zero value to a non-zero value, and which is cleared when the count value in the corresponding counter entry changes from a non-zero value to a zero value.

10. A data processing apparatus as claimed in claim 9, wherein the snoop indication circuitry maintains a copy of the vector entries provided by each of said at least one indication circuitry.

11. A data processing apparatus as claimed in claim 9, wherein the snoop indication circuitry maintains summary data derived from the vector entries provided by each of said at least one indication circuitry.

12. A data processing apparatus as claimed in claim 11, wherein for each segment the vector entries in the corresponding vector circuitry are partitioned to form a plurality of groups and the summary data is derived for each group.

13. A data processing apparatus as claimed in claim 12, wherein the hash operation performed by the hash circuitry is arranged such that each group contains vector entries pertaining to consecutive cache blocks in a memory region, such that the summary data enables the cache coherency circuitry to determine on a memory region by memory region basis whether a snoop operation needs to be performed in respect of the associated segment.

14. A data processing apparatus as claimed in claim 1, wherein at least one cache is a set associative cache, for that at least one cache each segment comprises a way of the cache, and the associated indication circuitry comprises:

a partial tag store for storing said segment filtering data in the form of partial tag values, for each set a partial tag value being provided for each way of that set;

the associated indication circuitry being arranged to identify from the address the set being accessed and to determine for each way, by comparing one or more tag bits of the address with the relevant partial tag value, whether the data is either definitely not stored in that way or is potentially stored within that way.

15. A data processing apparatus as claimed in claim 14, wherein the snoop indication circuitry maintains a copy of the partial tag values.

16. A data processing apparatus as claimed in claim 14, wherein the snoop indication circuitry maintains summary data derived from the partial tag values.

17. A data processing apparatus as claimed in claim 1, wherein the cache coherency circuitry includes a snoop control unit and a plurality of coherency control units, each coherency control unit being associated with one of the processing units and its associated cache, and being arranged to determine which of the access requests issued by the associated processing unit should cause a coherency operation to be initiated by the snoop control unit.

18. A method of managing cache coherency in a data processing apparatus, the data processing apparatus comprising a plurality of processing units performing data processing operations requiring access to data in shared memory, each processing unit when access to data is required issuing an access request specifying an address in memory associated with that data, each processing unit having a cache associated therewith storing a subset of said data for access by that processing unit, said cache comprising a plurality of data arrays and a corresponding plurality of TAG arrays, each data array including a plurality of cache lines storing data values, and the corresponding TAG array having a plurality of TAG entries, where each TAG entry stores a TAG value that is associated with the data values in a corresponding cache line, the cache being arranged as a plurality of segments, where each segment comprises a plurality of said cache lines, each cache being responsive to at least a subset of the access requests issued by its associated processing unit to perform a lookup procedure involving access to at least one TAG array of the cache, each cache having indication circuitry associated therewith containing segment filtering data, the indication circuitry being separate from the TAG arrays of the cache and being responsive to an address portion of the address to reference the segment filtering data to provide, for each of at least a subset of the segments, an indication as to whether the data associated with that address is either definitely not stored in that segment or is potentially stored within that segment, the indications produced by the indication circuitry being used by the cache to affect the lookup procedure, the method comprising the steps of:

providing cache coherency circuitry employing a cache coherency protocol configured to ensure data accessed by each processing unit is up-to-date;

providing snoop indication circuitry associated with the cache coherency circuitry;

deriving the content of the snoop indication circuitry from the segment filtering data of each said indication circuitry;

for certain access requests, initiating a coherency operation during which the snoop indication circuitry is referenced to determine whether any of said caches require subjecting to a snoop operation; and for each cache for which it is determined a snoop operation should be performed, issuing a notification to that cache identifying the snoop operation to be performed, wherein each said notification identifies which segments of the cache are to be subjected to the snoop operation.

19. A data processing apparatus, comprising:

a plurality of processing means for performing data processing operations requiring access to data in shared memory means, each processing means for issuing, when access to data is required, an access request specifying an address in memory associated with that data;

each processing means having a cache means associated therewith for storing a subset of said data for access by that processing means, said cache means comprising a plurality of data array means and a corresponding plurality of TAG array means, each data array means including a plurality of cache lines for storing data values, and the corresponding TAG array means having a plurality of TAG entries, where each TAG entry stores a TAG value that is associated with the data values in a corresponding cache line, the cache means being arranged as a plurality of segments, where each segment comprises a plurality of said cache lines, each cache means for performing a lookup procedure in response to at least a subset of the access requests issued by its associated processing means, the lookup procedure involving access to at least one TAG array means of the cache means;

each cache means having indication means associated therewith containing segment filtering data, the indication means being separate from the TAG arrays of the cache and for referencing, in response to an address portion of the address, the segment filtering data to provide, for each of at least a subset of the segments, an indication as to whether the data associated with that address is either definitely not stored in that segment or is potentially stored within that segment, the indications produced by the indication means being used by the cache means to affect which TAG arrays of the cache are accessed during the lookup procedure; and cache coherency means for employing a cache coherency protocol to ensure that said data accessed by each processing means is up-to-date, the cache coherency means having snoop indication means associated therewith whose content is derived from the segment filtering data of each said indication means, for certain access requests the cache coherency means initiating a coherency operation during which the snoop indication means is referenced to determine whether any of said cache means require subjecting to a snoop operation, for each cache means for which it is determined a snoop operation should be performed, the cache coherency means issuing a notification to that cache means identifying the snoop operation to be performed, wherein each said notification issued by the cache coherency means identifies which segments of the cache are to be subjected to the snoop operation.

* * * * *